US009438696B2

(12) United States Patent
Kruse et al.

(10) Patent No.: US 9,438,696 B2
(45) Date of Patent: Sep. 6, 2016

(54) DATA COMMUNICATION PROTOCOL

(71) Applicant: Microsoft Technology Licensing, LLC, Redmond, WA (US)

(72) Inventors: David Kruse, Kirkland, WA (US); Ahmed Mohamed, Sammamish, WA (US); Mathew George, Redmond, WA (US); Pradeep Madhavarapu, Bellevue, WA (US); Sundar Subbarayan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 313 days.

(21) Appl. No.: 13/946,550

(22) Filed: Jul. 19, 2013

(65) Prior Publication Data

US 2013/0304932 A1    Nov. 14, 2013

Related U.S. Application Data

(63) Continuation of application No. 13/663,827, filed on Oct. 30, 2012, now Pat. No. 8,825,885, which is a continuation of application No. 11/182,251, filed on Jul. 15, 2005, now Pat. No. 8,332,526.

(60) Provisional application No. 60/685,008, filed on May 25, 2005.

(51) Int. Cl.
*G06F 15/16* (2006.01)
*H04L 29/06* (2006.01)
(Continued)

(52) U.S. Cl.
CPC ......... *H04L 67/42* (2013.01); *G06F 17/30194* (2013.01); *H04L 29/08072* (2013.01);
(Continued)

(58) Field of Classification Search
USPC ........................................................ 709/230
See application file for complete search history.

(56) References Cited

U.S. PATENT DOCUMENTS 4,399,504 A    8/1983    Obermarck
4,780,821 A    10/1988   Crossley
(Continued)

FOREIGN PATENT DOCUMENTS

CN    1155119 A    7/1997
CN    1299484 A    6/2001
(Continued)

OTHER PUBLICATIONS

U.S. Appl. No. 13/174,271, Notice of Allowance mailed May 29, 2014, 10 pgs.
(Continued)

*Primary Examiner* — Richard G Keehn
(74) *Attorney, Agent, or Firm* — Kate Drakos; Danielle Johnston Holmes; Micky Minhas

(57) ABSTRACT

Described is a data communication protocol, in which a client and server negotiate in a manner that does not require the client to retry negotiation when servers are not capable of the client-desired protocol. In one example implementation, the desired protocol is SMB 2.0 or greater. The protocol describes a create command with possibly additional context data attached for built-in extensibility, and a compound command comprising a plurality of related commands or unrelated commands. A multi-channel command requests data transfer on a separate data channel, a signed capability verification may be used to ensure that a secure connection is established, and the protocol provides the ability to transfer extended error data from the server in response to a request.

20 Claims, 8 Drawing Sheets

(51) Int. Cl.
*H04L 29/08* (2006.01)
*G06F 17/30* (2006.01)
*H04L 12/801* (2013.01)

(52) U.S. Cl.
CPC .............. *H04L47/10* (2013.01); *H04L 63/10* (2013.01); *H04L 63/123* (2013.01); *H04L 67/06* (2013.01); *H04L 67/1097* (2013.01); *H04L 67/14* (2013.01); *H04L 67/147* (2013.01); *H04L 69/02* (2013.01); *H04L 69/14* (2013.01); *H04L 69/18* (2013.01); *H04L 69/24* (2013.01); *H04L 69/329* (2013.01); *Y02B 60/33* (2013.01)

(56) References Cited

U.S. PATENT DOCUMENTS

| | | | |
|---|---|---|---|
| 4,791,566 A | 12/1988 | Sudama | |
| 4,825,354 A | 4/1989 | Agrawal | |
| 4,887,204 A | 12/1989 | Johnson | |
| 4,891,785 A | 1/1990 | Donohoo | |
| 4,914,570 A | 4/1990 | Peacock | |
| 5,008,853 A | 4/1991 | Bly | |
| 5,109,519 A | 4/1992 | Zimmet | |
| 5,113,519 A | 5/1992 | Johnson | |
| 5,202,971 A | 4/1993 | Henson | |
| 5,218,696 A | 6/1993 | Baird et al. | |
| 5,261,051 A | 11/1993 | Masden et al. | |
| 5,265,261 A | 11/1993 | Rubin et al. | |
| 5,313,646 A | 5/1994 | Hendricks et al. | |
| 5,349,642 A | 9/1994 | Kingdon | |
| 5,375,207 A | 12/1994 | Blakely et al. | |
| 5,410,697 A | 4/1995 | Baird | |
| 5,437,013 A | 7/1995 | Rubin et al. | |
| 5,452,447 A | 9/1995 | Nelson | |
| 5,491,752 A | 2/1996 | Kaufman et al. | |
| 5,493,728 A | 2/1996 | Solton | |
| 5,513,314 A | 4/1996 | Kandasamy | |
| 5,522,042 A * | 5/1996 | Fee | H04L 29/06 709/226 |
| 5,535,375 A | 7/1996 | Eshel et al. | |
| 5,560,008 A | 9/1996 | Johnson et al. | |
| 5,588,117 A | 12/1996 | Karp et al. | |
| 5,628,005 A | 5/1997 | Hurvig | |
| 5,764,887 A | 6/1998 | Kells et al. | |
| 5,826,027 A | 10/1998 | Pedersen et al. | |
| 5,931,913 A | 8/1999 | Meriwether et al. | |
| 5,933,602 A | 8/1999 | Grover | |
| 5,978,802 A | 11/1999 | Hurvig | |
| 5,987,621 A | 11/1999 | Duso et al. | |
| 6,085,247 A | 7/2000 | Parsons et al. | |
| 6,092,199 A | 7/2000 | Dutcher | |
| 6,125,122 A | 9/2000 | Favichia et al. | |
| 6,131,125 A | 10/2000 | Rostoker et al. | |
| 6,208,952 B1 | 3/2001 | Goertzel | |
| 6,219,799 B1 | 4/2001 | Kandasamy | |
| 6,243,862 B1 | 6/2001 | Lebow | |
| 6,247,139 B1 | 6/2001 | Walker et al. | |
| 6,275,953 B1 | 8/2001 | Vahalia et al. | |
| 6,317,844 B1 | 11/2001 | Kleiman | |
| 6,324,581 B1 | 11/2001 | Xu et al. | |
| 6,349,250 B1 | 2/2002 | Hart et al. | |
| 6,349,350 B1 | 2/2002 | Harthorn et al. | |
| 6,401,123 B1 | 6/2002 | Shields et al. | |
| 6,430,691 B1 | 8/2002 | Di Santo et al. | |
| 6,438,691 B1 | 8/2002 | Mao | |
| 6,452,903 B1 | 9/2002 | Peck et al. | |
| 6,453,354 B1 * | 9/2002 | Jiang | G06F 17/30171 707/E17.01 |
| 6,640,226 B1 * | 10/2003 | Shringeri | G06F 17/30498 |
| 6,658,476 B1 | 12/2003 | Van | |
| 6,829,473 B2 | 12/2004 | Raman et al. | |
| 6,883,015 B1 | 4/2005 | Geen et al. | |
| 6,910,082 B1 | 6/2005 | Marcotte | |
| 6,928,577 B2 | 8/2005 | Moser et al. | |
| 7,020,651 B2 | 3/2006 | Ripley | |
| 7,050,984 B1 * | 5/2006 | Kerpelman | G06F 19/3412 600/300 |
| 7,103,007 B2 | 9/2006 | Natarajan et al. | |
| 7,111,035 B2 | 9/2006 | McClellan et al. | |
| 7,111,060 B2 | 9/2006 | Araujo et al. | |
| 7,197,535 B2 | 3/2007 | Salesky et al. | |
| 7,243,132 B2 | 7/2007 | Choi | |
| 7,290,141 B2 | 10/2007 | Sengodan et al. | |
| 7,293,192 B2 | 11/2007 | Allen et al. | |
| 7,318,102 B1 | 1/2008 | Krause et al. | |
| 7,330,910 B2 | 2/2008 | Young et al. | |
| 7,339,885 B2 | 3/2008 | Ahrens et al. | |
| 7,380,080 B2 | 5/2008 | Hughes | |
| 7,380,155 B2 | 5/2008 | Fung et al. | |
| 7,383,463 B2 | 6/2008 | Hayden et al. | |
| 7,386,889 B2 | 6/2008 | Shay | |
| 7,388,866 B2 | 6/2008 | Fan et al. | |
| 7,409,420 B2 | 8/2008 | Pullara et al. | |
| 7,421,502 B2 | 9/2008 | Czap et al. | |
| 7,434,087 B1 | 10/2008 | Singh | |
| 7,444,536 B1 | 10/2008 | Jairath | |
| 7,451,221 B2 | 11/2008 | Basani et al. | |
| 7,453,879 B1 | 11/2008 | Lo | |
| 7,457,722 B1 | 11/2008 | Shain et al. | |
| 7,475,142 B2 | 1/2009 | Sharma et al. | |
| 7,509,407 B2 | 3/2009 | Miller et al. | |
| 7,526,658 B1 | 4/2009 | He et al. | |
| 7,526,668 B2 | 4/2009 | Shitomi et al. | |
| 7,539,722 B2 | 5/2009 | Mohamed et al. | |
| 7,562,129 B1 | 7/2009 | Lee et al. | |
| 7,664,991 B1 | 2/2010 | Gunda et al. | |
| 7,673,066 B2 * | 3/2010 | Zheng | H04L 29/06 709/230 |
| 7,702,745 B2 | 4/2010 | Lin et al. | |
| 8,275,815 B2 | 9/2012 | Aronovich et al. | |
| 8,316,129 B2 | 11/2012 | Kruse et al. | |
| 8,332,526 B2 | 12/2012 | Kruse et al. | |
| 2002/0019874 A1 | 2/2002 | Borr | |
| 2002/0024963 A1 | 2/2002 | Reeve | |
| 2002/0062379 A1 * | 5/2002 | Widegren | H04L 29/06 709/227 |
| 2002/0073211 A1 | 6/2002 | Lin et al. | |
| 2002/0083130 A1 * | 6/2002 | Shimada | G06F 17/30887 709/203 |
| 2002/0152315 A1 | 10/2002 | Kagan et al. | |
| 2002/0161980 A1 | 10/2002 | Nishikawa | |
| 2003/0014480 A1 | 1/2003 | Pullara et al. | |
| 2003/0018927 A1 | 1/2003 | Gadir et al. | |
| 2003/0056069 A1 | 3/2003 | Cabrera et al. | |
| 2003/0058277 A1 | 3/2003 | Bowman-Amuah | |
| 2003/0093643 A1 | 5/2003 | Britt, Jr. | |
| 2003/0093678 A1 | 5/2003 | Bowe et al. | |
| 2003/0112754 A1 | 6/2003 | Ramani et al. | |
| 2003/0115341 A1 | 6/2003 | Sinha et al. | |
| 2003/0126195 A1 | 7/2003 | Reynolds et al. | |
| 2003/0140129 A1 | 7/2003 | Livnat et al. | |
| 2003/0169859 A1 | 9/2003 | Strathmeyer et al. | |
| 2003/0182282 A1 | 9/2003 | Ripley | |
| 2004/0003210 A1 | 1/2004 | Duale et al. | |
| 2004/0003241 A1 | 1/2004 | Sengodan et al. | |
| 2004/0018829 A1 | 1/2004 | Raman et al. | |
| 2004/0019660 A1 | 1/2004 | E. et al. | |
| 2004/0032876 A1 * | 2/2004 | Garg | H04L 12/2856 370/443 |
| 2004/0044930 A1 * | 3/2004 | Keller | G06F 11/0793 714/48 |
| 2004/0103342 A1 | 5/2004 | Moser et al. | |
| 2004/0111527 A1 | 6/2004 | Czap, Jr. et al. | |
| 2004/0136325 A1 | 7/2004 | Dobric et al. | |
| 2004/0160909 A1 | 8/2004 | Sheynblat | |
| 2004/0215794 A1 | 10/2004 | Lauer | |
| 2004/0225952 A1 | 11/2004 | Brown et al. | |
| 2004/0255202 A1 * | 12/2004 | Wong | G06F 11/0745 714/43 |
| 2004/0260748 A1 | 12/2004 | Springer et al. | |
| 2004/0267932 A1 | 12/2004 | Voellm et al. | |
| 2004/0267935 A1 * | 12/2004 | Patiejunas | H04L 69/14 709/227 |

(56) References Cited

U.S. PATENT DOCUMENTS

| | | |
|---|---|---|
| 2004/0268118 A1 | 12/2004 | Bazran Bejarano |
| 2005/0010670 A1 | 1/2005 | Greschler et al. |
| 2005/0015511 A1 | 1/2005 | Izmailov et al. |
| 2005/0015747 A1* | 1/2005 | Zatloukal ............... G06F 8/33 717/109 |
| 2005/0021832 A1 | 1/2005 | Bennett et al. |
| 2005/0038828 A1 | 2/2005 | Kaluskar et al. |
| 2005/0041686 A1 | 2/2005 | Roy et al. |
| 2005/0055345 A1 | 3/2005 | Ripley |
| 2005/0060442 A1 | 3/2005 | Beverly et al. |
| 2005/0091212 A1 | 4/2005 | Mohamed et al. |
| 2005/0102537 A1 | 5/2005 | Zheng |
| 2005/0111030 A1 | 5/2005 | Berkema et al. |
| 2005/0114670 A1* | 5/2005 | Bowe .................. H04L 9/3247 713/180 |
| 2005/0125378 A1 | 6/2005 | Kawada |
| 2005/0129045 A1 | 6/2005 | Machulsky et al. |
| 2005/0131832 A1 | 6/2005 | Fransdonk |
| 2005/0132077 A1 | 6/2005 | Biran et al. |
| 2005/0138528 A1 | 6/2005 | Ameigeiras et al. |
| 2005/0149817 A1 | 7/2005 | Biran et al. |
| 2005/0177635 A1 | 8/2005 | Schmidt et al. |
| 2005/0182850 A1 | 8/2005 | Kohno |
| 2005/0198113 A1 | 9/2005 | Mohamed et al. |
| 2005/0198247 A1* | 9/2005 | Perry .................. H04L 7/0008 709/223 |
| 2005/0198359 A1 | 9/2005 | Basani et al. |
| 2005/0198380 A1 | 9/2005 | Panasyuk et al. |
| 2005/0223014 A1 | 10/2005 | Sharma et al. |
| 2005/0228884 A1 | 10/2005 | Hawley |
| 2005/0246803 A1 | 11/2005 | Spencer |
| 2005/0248803 A1* | 11/2005 | Ohara ............... G06F 3/1209 358/1.15 |
| 2005/0251448 A1* | 11/2005 | Gropper ............ G06Q 10/1093 705/14.61 |
| 2005/0257022 A1 | 11/2005 | Hughes |
| 2005/0258022 A1 | 11/2005 | Horton et al. |
| 2005/0262084 A1* | 11/2005 | Tomita ................. G06F 3/061 |
| 2005/0262103 A1 | 11/2005 | Stakutis et al. |
| 2005/0273592 A1* | 12/2005 | Pryor ...................... H04L 9/32 713/150 |
| 2006/0031519 A1 | 2/2006 | Helliwell et al. |
| 2006/0041698 A1 | 2/2006 | Han et al. |
| 2006/0045005 A1 | 3/2006 | Blackmore et al. |
| 2006/0047818 A1 | 3/2006 | Kruglick et al. |
| 2006/0059118 A1 | 3/2006 | Byrd et al. |
| 2006/0080443 A1 | 4/2006 | Kruglick et al. |
| 2006/0080568 A1 | 4/2006 | Subbaraman et al. |
| 2006/0085328 A1 | 4/2006 | Cohen et al. |
| 2006/0095382 A1 | 5/2006 | Mahlbacher |
| 2006/0130107 A1 | 6/2006 | Gonder et al. |
| 2006/0168262 A1 | 7/2006 | Frazer |
| 2006/0206705 A1 | 9/2006 | Khosravi |
| 2006/0271692 A1 | 11/2006 | Kruse et al. |
| 2006/0271697 A1 | 11/2006 | Kruse et al. |
| 2006/0281525 A1 | 12/2006 | Borissov |
| 2007/0150558 A1 | 6/2007 | Teodosiu et al. |
| 2007/0171793 A1 | 7/2007 | Mesut et al. |
| 2007/0192326 A1 | 8/2007 | Angal et al. |
| 2007/0220155 A1 | 9/2007 | Nalla et al. |
| 2008/0010485 A1 | 1/2008 | Shitomi et al. |
| 2008/0126704 A1 | 5/2008 | Ulrich et al. |
| 2008/0151885 A1 | 6/2008 | Horn et al. |
| 2008/0172397 A1 | 7/2008 | Maeda et al. |
| 2008/0256231 A1 | 10/2008 | Burnett et al. |
| 2009/0077097 A1 | 3/2009 | Lacapra et al. |
| 2009/0138615 A1 | 5/2009 | Cristallo et al. |
| 2009/0172085 A1 | 7/2009 | Arthursson |
| 2009/0319661 A1 | 12/2009 | Shiozawa et al. |
| 2009/0327798 A1 | 12/2009 | D'Amato et al. |
| 2010/0042715 A1 | 2/2010 | Tham et al. |
| 2010/0161855 A1 | 6/2010 | Mohamed et al. |
| 2010/0185704 A1 | 7/2010 | George et al. |
| 2011/0040826 A1 | 2/2011 | Chadzelek et al. |
| 2012/0151249 A1 | 6/2012 | Swan et al. |
| 2013/0007180 A1 | 1/2013 | Talpey et al. |
| 2013/0007518 A1 | 1/2013 | George et al. |
| 2013/0066941 A1 | 3/2013 | Kruse et al. |
| 2013/0067095 A1 | 3/2013 | Kruse et al. |
| 2013/0091199 A1 | 4/2013 | Kruse et al. |
| 2013/0097211 A1 | 4/2013 | Kruse et al. |
| 2015/0281404 A1 | 10/2015 | Kruse et al. |
| 2015/0365482 A1 | 12/2015 | Kruse et al. |

FOREIGN PATENT DOCUMENTS

| | | |
|---|---|---|
| CN | 1767472 A | 5/2006 |
| CN | 1882933 | 12/2006 |
| CN | 1906593 A | 1/2007 |
| CN | 1937532 A | 3/2007 |
| CN | 101207635 A | 6/2008 |
| CN | 101594320 | 12/2009 |
| CN | 101605194 A | 12/2009 |
| CN | 101926155 | 12/2010 |
| EP | 1 259 045 A2 | 11/2002 |
| EP | 1 259 045 A3 | 11/2002 |
| EP | 1643406 A2 | 4/2006 |
| EP | 1669850 | 6/2006 |
| EP | 1 727 056 | 11/2006 |
| EP | 2727287 | 5/2014 |
| JP | 60-019341 | 1/1985 |
| JP | 62-297927 | 12/1987 |
| JP | 63-061148 | 3/1988 |
| JP | 63-205747 | 8/1988 |
| JP | 63-256165 | 10/1988 |
| JP | 64-061148 | 3/1989 |
| JP | 02-101847 | 4/1990 |
| JP | 03-048558 | 3/1991 |
| JP | 03-074745 | 3/1991 |
| JP | 04-172039 | 6/1992 |
| JP | 04-229746 | 8/1992 |
| JP | 05-089048 | 4/1993 |
| JP | 05-143488 | 6/1993 |
| JP | 06-075890 | 3/1994 |
| JP | H10-133971 | 5/1998 |
| JP | 10-313342 | 11/1998 |
| JP | 11-055314 | 2/1999 |
| JP | 2001-077844 | 3/2001 |
| JP | 2001-094613 | 4/2001 |
| JP | 2003-016766 | 1/2003 |
| JP | 2003-504699 | 2/2003 |
| JP | 2003-069610 | 3/2003 |
| JP | 2003-281091 | 3/2003 |
| JP | 2003-125022 | 4/2003 |
| JP | 2003-337717 | 11/2003 |
| JP | 2004-005427 | 1/2004 |
| JP | 2004-078949 | 3/2004 |
| JP | 2004-229143 | 8/2004 |
| JP | 2005-032172 | 2/2005 |
| JP | 2005-517241 | 6/2005 |
| JP | 2005-322016 | 11/2005 |
| JP | 2006-191617 | 7/2006 |
| JP | 2007-49755 | 2/2007 |
| JP | 2007-058506 | 3/2007 |
| JP | 3967758 | 6/2007 |
| KR | 10-1994-0001700 | 3/1994 |
| KR | 10-0860152 | 9/2008 |
| RU | 2118051 C1 | 8/1998 |
| RU | 2313824 C2 | 12/2007 |
| RU | 2365983 C2 | 8/2009 |
| RU | 2368944 C2 | 9/2009 |
| RU | 2380749 C2 | 1/2010 |
| WO | WO 03/096646 | 11/2003 |
| WO | 2004-003765 | 1/2004 |

OTHER PUBLICATIONS

U.S. Appl. No. 13/228,818, Amendment and Response filed Jun. 16, 2014, 15 pgs.
Chinese 2nd Office Action in Application 201110329007.4, mailed Jun. 12, 2014, 8 pgs.
U.S. Appl. No. 13/228,732, Amendment after Allowance filed Jun. 4, 2014, 7 pgs.

(56) References Cited

OTHER PUBLICATIONS

U.S. Appl. No. 13/228,732, USPTO response to Amendment after Allowance mailed Jun. 27, 2014, 2 pgs.
Chinese 2nd Office Action in Application 201210331041.X, mailed Mar. 9, 2015, 10 pgs.
European Communication and partial Search Report in Application 12830847.5, mailed Mar. 18, 2015, 6 pgs.
European Communication in Application 12829430.3, mailed Mar. 3, 2015, 1 page.
U.S. Appl. No. 14/473,488, Notice of Allowance mailed Apr. 16, 2015, 2 pgs.
U.S. Appl. No. 13/228,818, Office Action mailed Mar. 25, 2015, 18 pgs.
U.S. Appl. No. 13/172,757, Office Action mailed Apr. 10, 2015, 34 pgs.
Chinese Notice of Allowance in Application 201110462797.3, mailed Mar. 3, 2015, 4 pgs.
European Search Report in Application 12805065.5, mailed Jun. 1, 2015, 9 pgs.
Sapuntzakis, C. et al., Internet Draft: "TCP RDMA option"; Available at: draft-csapuntz-tcprdma-00.txt, Feb. 1, 2000, 20 pgs.
Defense Advanced Research Projects Agency, by Information Sciences Institute Univ. of So. CA., "Internet Protocol—Darpa Internet Program Protocol Specification"; Available at: https://www.rfc-editor.org/rfc/rfc791.txt, Sep. 1, 1981, 52 pgs.
Recio, R. et al., "A Remote Direct Memory Access Protocol Specification", Network Working Group Request for Comments: 5040, Available at: https://tools.ietf.org/html/rfc5040, Oct. 1, 2007, 66 pgs.
European Partial Search Report in Application 12804233.0, mailed May 7, 2015, 7 pgs.
South African Notice of Allowance in Application 2014/01381, mailed May 5, 2015, 1 page.
U.S. Appl. No. 13/174,271, Notice of Allowance mailed Aug. 8, 2014, 2 pgs.
U.S. Appl. No. 13/228,818, Office Action mailed Aug. 15, 2014, 17 pgs.
Chinese 1st Office Action in Application 201210330725.8, mailed Oct. 10, 2014, 11 pgs.
Chinese 1st Office Action in Application 201210434813.2, mailed Nov. 3, 2014, 10 pgs.
U.S. Appl. No. 13/228,818, Amendment and Response filed Nov. 17, 2014, 14 pgs.
U.S. Appl. No. 13/664,012, Amendment and Response filed Mar. 19, 2014, 7 pgs.
U.S. Appl. No. 13/228,818, Office Action mailed Mar. 14, 2014, 18 pgs.
European Intention to Grant in Application 10013021.0, mailed Jan. 28, 2014, 7 pgs.
New Zealand Notice of Acceptance in Application 622122, mailed Jan. 15, 2015, 1 page.
U.S. Appl. No. 14/473,488, Notice of Allowance mailed Feb. 12, 2015, 5 pgs.
European Extended Search Report in Application 12829430.3, mailed Feb. 12, 2015, 6 pgs.
U.S. Appl. No. 13/228,818, Amendment and Response filed Oct. 18, 2013, 24 pgs.
Chinese 1st Office Action in Application 201110329007.4, mailed Oct. 10, 2013, 13 pgs.
Chinese 2nd Office Action in Application 201110462797.3, mailed Sep. 24, 2014, 6 pgs.
Chinese 1st Office Action in Application 201210331041.X, mailed Sep. 3, 2014, 14 pgs.
New Zealand Examination Report in Application 622122, mailed Aug. 28, 2014, 2 pgs.
U.S. Appl. No. 13/174,271, Supplemental Notice of Allowance mailed Sep. 8, 2014, 2 pgs.
U.S. Appl. No. 13/663,827, Notice of Allowance mailed Jan. 13, 2014, 10 pgs.
U.S. Appl. No. 13/664,012, Notice of Allowance mailed Dec. 24, 2013, 11 pgs.
U.S. Appl. No. 13/174,271, Office Action mailed Jan. 10, 2014, 17 pgs.
European Supplementary Search Report in Application 11846483.3, mailed Dec. 16, 2014, 10 pgs.
European Communication in Application 11846483.3, mailed Jan. 12, 2015, 1 page.
Chinese 3rd Office Action in Application 201110329007.4, mailed Dec. 29, 2014, 6 pgs.
U.S. Appl. No. 14/473,488, Notice of Allowance mailed Jan. 26, 2015, 15 pgs.
U.S. Appl. No. 13/228,732, Notice of Allowance mailed Mar. 4, 2014, 17 pgs.
U.S. Appl. No. 13/172,757, Amendment and Response filed Mar. 6, 2014, 16 pgs.
U.S. Appl. No. 13/174,271, Amendment and Response filed Apr. 10, 2014, 10 pgs.
U.S. Appl. No. 13/663,827, Notice of Allowance mailed Apr. 25, 2014, 10 pgs.
U.S. Appl. No. 13/664,012, Notice of Allowance mailed May 20, 2014, 13 pgs.
Chinese 1st Office Action in Application 201110462797.3, mailed Apr. 16, 2014, 11 pgs.
Aboba et al., Extensible Authentication Protocol (EAP) [online], See Fast Connect, RFC 3748, Jun. 2004, [Retrieved Mar. 3, 2007], Retrieved from: http://www.ietf.org/rfc/rfc3748.txt?number=3748.
Almeida, "FIFS: A Framework for Implementing User-Mode File Systems in Windows NT", Proceedings of the 3rd USENIX Windows NT Symposium, Jul. 12-15, 1999, 19 pgs.
Alvisi et al., "Low-Overhead Protocols for Fault-Tolerant File Sharing"; In Proceedings of the IEEE 18th International Conference on Distributed Computing Systems; 1998; 10 pgs.
ANSI, Financial Institution Message Authentication (Wholesale), Financial Services Technical Publication, ANSI X9.9-1994, Aug. 15, 1986; 38 pgs.
Asokan et al., Server Supported Signatures, Journal of Computer Security, Fall 1997; 13 pgs.
Bell Labs, Plan 9 default Fossil File System [online], [Retrieved Sep. 17, 2007], Retrieved from: http://plan9.bell-labs.com/magic/man2html/4/fossil; 4 pgs.
Bensaou et al., Credit-Based Fair Queueing (CBFQ): A Simple Service-Scheduling Algorithm for Packet-Switched Networks, IEEE/ACM Transactions on Networking, vol. 9, No. 5, Oct. 2001.
Chinese 4th Office Action in Application 200510127998.2, mailed Nov. 16, 2011, 7 pgs.
Chinese 5th Office Action in Application 200510127998.2, mailed Mar. 2, 2012, 8 pgs.
Chinese Notice of Allowance in Application 2005101279978.2, mailed Dec. 5, 2011, 4 pgs.
Chinese Notice of Allowance in Application 200510127998.2, mailed Aug. 20, 2012, 4 pgs.
Chinese Notice of Entering into Substantive Examination in Application 201210331041.X, mailed Mar. 6, 2013, 3 pgs.
Chinese Office Action dated Apr. 29, 2010 in Application No. 200510127997.8, 16 pgs.
Chinese Office Action dated Apr. 29, 2010 in Application No. 200510127998.2, 10 pgs.
Chinese Second Office Action dated Mar. 3, 2011 in Application No. 200510127998.2, 8 pgs.
Chinese Second Office Action dated Mar. 30, 2011 in Application No. 200510127997.8, 26 pgs.
Chinese Third Office Action dated Jul. 7, 2011 in Application No. 200510127998.2, 9 pgs.
CIFS Oplock File Locking, MSDN, [Retrieved Jan. 7, 2008], Retrieved from: http://msdn2.microsoft.com/en-us/library/aa302210.aspx; 3 pgs.
Dehaese, G., *The ISO 9660 File System* [online], May 1995, [Retrieved Sep. 14, 2007], Retrieved from: http://users.pandora.be/it3.consultants.bvba/handouts/ISO9960.html.
Digital Equipment Corporation, *Introduction to RSX-11M* [online, Order No. AA-L763B-TC, RSX-11M Version 4.2, First Printing Sep. 1979, Revised Nov. 1981 and Jul. 1985, [Retrieved Aug. 9,

(56) References Cited

OTHER PUBLICATIONS

2007], Retrieved from: http://www.computer.museum.uq.edu.au/RSX-11%20Manuals.html; 65 pgs.
Digital Equipment Corporation, *RSX-11M/M-Plus RMS-11 User's Guide* [online], Order No. AA-L669A-TC, Apr. 1983, [Retrieved Aug. 17, 2007], Retrieved from: http://www.computer.museum.uq.edu.au/RSX-11%20Manuals.html; 186 pgs.
ECMA, Volume and File Structure for Write-Once and Rewritable Media using Non-Sequential Recording for Information Interchange 3rd Edition [online], ECMA-167, Jun. 1997, [Retrieved Aug. 9, 2007, Retrieved from: http://www.ecma-international.org/publications/files/ECMA-ST/Ecma-167.pdf; 150 pgs.
European Exam Report in Application 05111885.9 mailed Sep. 13, 2007, 5 pgs.
European Invitation to Correct Defects in Application No. 08008916.2 mailed Sep. 4, 2008, 6 pgs.
European Notice of Allowance in Application 05111885.9 mailed Jun. 11, 2008, 6 pgs.
European Notice of Allowance in Application 080089162 mailed Jan. 24, 2011, 6 pgs.
European Notice to Grant in Application 05111885.9 mailed Oct. 9, 2008, 1 page.
European Search Report dated Feb. 1, 2011 in Application No. 10013021.0, 9 pgs.
European Search Report dated Feb. 15, 2006 in Application No. 05111729.9, 193 pgs.
European Search Report dated Feb. 22, 2006 in Application No. 05111729.9, 8 pgs.
European Search Report dated Jan. 20, 2006 in Application No. RS113279/US18298905, 2 pgs.
European Search Report dated Jan. 20, 2006 in Application No. RS113280/US18225105, 4 pgs.
European Search Report dated Jan. 4, 2011 in Application No. 10012923.8, 9 pgs.
European Search Report dated Jun. 18, 2008 in Application No. 08008916.2, 9 pgs.
European Search Report dated Sep. 19, 2006 in Application No. 055111885.9, 8 pgs.
French, Steven M., "A New Network File System is Born: Comparison of SMB2, CIFS, and NFS", retrieved Mar. 23, 2011, 14 pgs.
Gifford et al., *The Cedar File System*, Communications of the ACM, vol. 31, No. 3, Mar. 1998; 11 pgs.
Greenberg et al., "NFILE—A File Access Protocol"; Network Working Group; RFC 1037; Dec. 1997; 43 pgs.
Gu et al., "SABUL: A High Performance Data Transfer Protocol"; IEEE Communications Letters; 2001; 11 pgs.
Hartman; "The Zebra Striped Network File System"; Doctoral dissertation at the University of California at Berkeley; 1991; 159 pgs.
Hertel, Implementing CIFS The Common Internet File System [online], [Retrieved Jul. 13, 2007], Retrieved from: http://ubiqx.org/cifs/; 3 pgs.
Hiltunen et al., "Implementing Integrated Fine-Grain Customizable QoS Using Cactus"; The 29th Annual International Symposium on Fault-Tolerant Computing (Fast Abstract); Madison, WI; 1999, 2 pgs.
Hitz et al., File System Design for an NFS File Server Appliance [online], Network Appliance, TR 3002, 1994, [Retrieved Aug. 9, 2007], Retrieved from: http://www.netapp.com/library/tr/3002.pdf; 13 pgs.
Hobbit, CIFS: Common Insecurities Fail Scrutiny [online], Avian Research, Jan. 1997, Retrieved from: http://web.textfiles.com/hacking/cifs.txt; 39 pgs.
Hong Kong Certificate of Grant in Application 07105689.8 mailed Jun. 26, 2009, 2 pgs.
IBM, IBM Personal Computer Seminar Proceedings, vol. 2, No. 5, Sep. 1984; 13 pgs.
Indian First Exam Report in Application 3305/DE/L2005, mailed Mar. 28, 2013, 2 pgs.

International Organization for Standardization, Banking—Approved algorithms for message authentication—, ISO 8731-1, Jun. 1, 1987; 4 pgs.
Japanese Office Action in Application 200510127997.8 mailed Aug. 3, 2011, 8 pgs.
Japanese Office Notice of Allowance in Application 2006-307121 mailed Feb. 14, 2012, 6 pgs.
Japanese Office Notice of Rejection in Application 2006-307121 mailed Aug. 12, 2011, 5 pgs.
Japanese Office Notice of Rejection mailed Apr. 3, 2007 in Application No. 2005-356145, 6 pgs.
Japanese Office Notice of Rejection mailed Jan. 15, 2008 in Application No. 2005-356145, 5 pgs.
Japanese Office Notice of Rejection mailed Mar. 10, 2006 in Application No. 2005-356146, 5 pgs.
Japanese Office Notice of Rejection mailed May 12, 2006 in Application No. 2005-356145, 4 pgs.
Japanese Office Notice of Rejection mailed Nov. 10, 2006 in Application No. 2005-356146, 3 pgs.
John H. Samba Team Terpstra, "Chapter 32. High Availability Part III. Advanced Configuration", retrieved Mar. 22, 2011, 6 pages.
Kent et al., IP Authentication Header [online], RFC 2402, Nov. 1998, [Retrieved Aug. 9, 2007], Retrieved from: http://tools.ietf.org/html/rfc2402, 20 pgs.
Kent et al., Security Architecture for the Internet Protocol [online], RFC 2401, Nov. 1998, [Retrieved Jun. 6, 2007], Retrieved from: http://www.ietf.rg/rfc/rfc2401.txt?number=2401, 62 pgs.
Klima, "Tunnels in Hash Functions: MD5 Collisions Within a Minute", Version 1, Mar. 2006, Version Apr. 2, 2006, Cryptology ePrint Archive, 17 pgs.
Korean Notice of Preliminary Rejection mailed Jan. 21, 2011, Application No. 2007-0080691, 4 pgs.
Korean Notice of Rejection mailed Nov. 17, 2006 in Application No. 10-2005-0124340, 5 pgs.
Krawczyk, "HMAC: Keyed-Hashing for Message Authentication", RFC-2104, Feb. 1997, http://www.jetf.org/rfc/rfc2104.txt, 10 pgs.
Leach et al., CIFS Logon and Pass Through Authentication Preliminary Draft [online], Jan. 3, 1997, 22 pgs.
Leach et al., CIFS/E Browser Protocol Preliminary Draft [online], Jan. 10, 1997, 33 pgs.
Leach et al., draft-leach-cifs-print-spec-00.txt, CFIS Printing Specification Preliminary Draft [online], Jan. 31, 1997; 30 pgs.
Leach et al., draft-leach-cifs-rap-spec-00.txt, CFIS Remote Administration Protocol Preliminary Draft [online], Feb. 26, 1997; 39 pgs.
Leach, P. et a., "A Common Internet File System (CIFS/1.0) Protocol Preliminary Draft", draft-leach-cifs-v1-spec-02, Mar. 13, 1997, http://microsoft.com/mscorp/ip/protocols/BSTD/CIFS; 160 pgs.
Leach, P., Naik, D., A Common Internet File System (CIFS/1.0) Protocol Preliminary Draft [online], Dec. 19, 1997. Retrieved from: http://tools.ietf.org/html/draft-leach-cifs-v1-spec-01; 132 pgs.
LeGrow, "Maintenance—MSRPC Update (Version 11) and SMB Update (Version 3)"; cfr-users mailing list; http://list.nfr.com/mailman/listingfo/nfr-users; May 20, 2004; 2 pgs.
Linn, "Generic Security Service Application Program Interface, Version 2, Update 1", RFC 2743, Jan. 2000, http://www.ieft.org/rfc/rfc2743.txt, 90 pgs.
Loafman, Zach, "SMB1/SMB2; A BSD Perspective", retrieved Mar. 22, 2011, 35 pgs.
Maiworm, Daniel, "Symantec Enterprise Vault", Retrieved at http://www.cstl.com/products/Symantec/Symantec-Enterprise_Vault/File System Archiving.pdf, Feb. 5,2007, pp. 35.
Microsoft Computer Dictionary, Microsoft Press, Fifth Edition, 2002, p. 486.
Morris, "Andrew: A Distributed Personal Computing Environment", Communications of the ACM, vol. 29, No. 3, Mar. 1986, New York, 20 pgs.
MS-SMB2—Preview: Server Message Block (SMB) Version 2 Protocol Specification, copyright 2010 Microsoft Corporation, 309 pgs.

(56) References Cited

OTHER PUBLICATIONS

Mullender, "A Distributed File Service Based on Optimistic Concurrency Control", Proceedings of the Tenth ACM Symposium on Operating Systems Principles, Dec. 1-4, 1985, Orcas Island, WA, 14 pgs.
Murphy, Origins and Development of TOPS-20 [online], © 1989, 1996, [Retrieved Aug. 9, 2007], Retrieved from: http://www.opost.com/dlm/tenex/hbook.html; 28 pgs.
National Bureau of Standards, *Computer Data Authentication*, Federal Information Processing Standards Publication 113, May 30, 1985; 9 pgs.
NTFS Design Goals and Features, Retrieved at http://wininternals.uw.hu/ch12lev1sec4.html, Retrieved Date: Oct. 11, 2010, pp. 9.
Oehme, et al.," IBM Scale out File Services: Reinventing network-attached storage", Retrieved at http://www-935.ibm.com/services/us/its/pdf/sofs-am-journal-final-07010B.pdf, vol. 52 No. 4/5 July/September 200B, 10 Pages.
PCT International Search Report and Written Opinion in International Application PCT/US2011/063618, mailed Jun. 28, 2012, 9 pgs.
PCT International Search Report and Written Opinion in International Application PCT/US2012/041049, mailed Jan. 17, 2013, 12 pgs.
PCT International Search Report and Written Opinion in International Application PCT/US2012/041703, mailed Feb. 14, 2013, 13 pgs.
PCT International Search Report and Written Opinion in International Application PCT/US2012/054038, mailed Feb. 20, 2013, 10 pgs.
PCT International Search Report and Written Opinion in International Application PCT/US2012/054039, mailed Feb. 27, 2013, 11 pgs.
Periasamy, Anand Babu, "Next-Gen Linux File Systems: Change is the New Constant", retrieved Mar. 23, 2011, 4 pages.
Pranevich, "The Wonderful World of Linux 2.6"; 2005; 17 pgs.
Rivest, "The MD5 Message-Digest-Algorithm", RFC 1321, Apr. 1992, http://www.jetf.org/rfc/rfc2104.txt, 19 pgs.
Rubin, F., *Message Authentication Using Quadratic Residues* [online], Jan. 31, 1995, [Retrieved Sep. 14, 2007], Retrieved from: http://www.mastersoftware.biz/crypt002.htm; 6 pgs.
Samba Team, *The Samba Team are pleased to announce Samba1.9.18* [online], Jan. 7, 1998, [Retrieved Jan. 4, 2008], Retrieved from: http://de.samba.org/samba/history/samba1.9.18.html; 4 pgs.
Satran et al. *Internet Small Computer Systems Interface (iSCSI)* [online], RFC 3720, Apr. 2004, [Retrieved Mar. 3, 2007], Retrieved from: http://www.ietf.org/rfc/rfc3720.txt?number=3720; 67 pgs.
Satyanaryanan et al, "Scalable, Secure and Highly Available Distributed File Access", May 1990, 12 pgs.
Schneier, B., *Applied Cryptography Protocols, Algorithm and Source Code in C Second Edition*, John Wiley & Sons, Inc., © 1996; 788 pgs.
Shepler, S. et al., "Network File System (NFS) Version 4 Protocol", Network Working Group, Request for Comments: 3530, Apr. 2003, 275 pgs.
Shepler, S. et al., "NFS Version 4 Protocol", RFC 3010, Proceedings on the 2nd International System Administration and Networking Conference (SANE2000), Dec. 2000, 212 pgs.
Shepler, S., *NFS Version 4 Design Considerations* [online], RFC 2624, Jun. 1999, [Retrieved Jan. 4, 2008], Retrieved from: http://tools.ietf.org/html/rfc2624; 22 pgs.
SMB: The Server Message Block Protocol [online], 1999, Retrieved from: http://ubiqx.org/cifs/SMB.html; 84 pgs.
SNIA, *Common Internet File System (CIFS) Technical Reference* [online], Mar. 1, 2002, Retrieved from: http://www.snia.org/tech_activities/CIFS/CIFS-TR-1p00__FINAL.pdf; 150 pgs.
Soules et al., *Metadata Efficiency in a Comprehensive Versioning File System*, May 2002; 33 pgs.
Srinivasan et al., Spritely NFS: Implementation and Performance of Cache-Consistency Protocols [online], May 1989, [Retrieved Jan. 4, 2008], Retrieved from: http://www.hpl.hp.com/techreports/Compaq-DEC/WRL-89-5.pdf; 35 pgs.
Szczerbina, "Novell's NetWare Core Protocol", Dr. Dobb's Journal, Nov. 1993, 17 pgs.
Talpey et al., "NFSv4 Session Extensions, draft-ietf-nfsv4-sess-01"; Internet Draft; The Internet Society; Feb. 2005; 70 pgs.
The Java CIFS Client Library [online], [Retrieved Jul. 13, 2007], Retrieved from: http://jcifs.samba.org/, 8 pgs.
The Open Group; Technical Standard; Protocols for X/Open PC Interworking: SMB, Version 2; http://www.opengroup.org/onlinepubs/9697999099/toc.pdf; retrieved on Sep. 1, 1992; 534 pgs.
Tichy, W., RCS—A System for Version Control [online], Jan. 3, 1991, [Retrieved Aug. 6, 2007], Retrieved from: http://www.cs.purdue.edu/homes/trinkle/RCS/rcs.ps; 20 pgs.
TOPS-20 [online], Wikipedia, [Retrieved Mar. 4, 2007], Retrieved from: http://en.wikipedia.org/wiki/TOPS-20; 4 pgs.
Tridgell, "Inside Microsoft Networking", Jun. 25, 1998, 6 pgs.
U.S. Official Action dated Feb. 2, 2010 cited in U.S. Appl. No. 11/182,989, 18 pgs.
U.S. Official Action dated Jan. 25, 2010 cited in U.S. Appl. No. 11/182,251, 20 pgs.
U.S. Official Action dated Jul. 23, 2010 cited in U.S. Appl. No. 11/182,989, 17 pgs.
U.S. Official Action dated Jul. 30, 2010 cited in U.S. Appl. No. 11/182,251, 23 pgs.
U.S. Official Action dated Mar. 13, 2009 cited in U.S. Appl. No. 11/182,251, 20 pgs.
U.S. Official Action dated May 14, 2009 cited in U.S. Appl. No. 11/182,989, 23 pgs.
U.S. Appl. No. 11/182,251, Amendment and Response filed Oct. 11, 2012, 2 pgs.
U.S. Appl. No. 11/182,251, Amendment and Response filed Nov. 26, 2008, 12 pgs.
U.S. Appl. No. 11/182,251, Amendment and Response filed Nov. 30, 2010, 17 pgs.
U.S. Appl. No. 11/182,251, Amendment and Response filed Nov. 4, 2011, 17 pgs.
U.S. Appl. No. 11/182,251, Amendment and Response filed Apr. 26, 2010, 17 pgs.
U.S. Appl. No. 11/182,251, Amendment and Response filed May 30, 2012, 14 pgs.
U.S. Appl. No. 11/182,251, Amendment and Response filed Jun. 15, 2009, 14 pgs.
U.S. Appl. No. 11/182,251, Amendment and Response filed Sep. 14, 2009, 7 pgs.
U.S. Appl. No. 11/182,251, Notice of Allowance mailed Jul. 12, 2012, 8 pgs.
U.S. Appl. No. 11/182,251, Office Action mailed Jan. 30, 2012, 24 pgs.
U.S. Appl. No. 11/182,251, Office Action mailed Nov. 6, 2008, 4 pgs.
U.S. Appl. No. 11/182,251, Office Action mailed Aug. 22, 2008, 7 pgs.
U.S. Appl. No. 11/182,251, Office Action mailed Aug. 4, 2011, 23 pgs.
U.S. Appl. No. 12/964,749, Amendment and Response filed Apr. 29, 2013, 9 pgs.
U.S. Appl. No. 12/964,749, Amendment and Response filed Aug. 23, 2013, 8 pgs.
U.S. Appl. No. 12/964,749, Notice of Allowance mailed Sep. 5, 2013, 11 pgs.
U.S. Appl. No. 12/964,749, Office Action mailed Jan. 29, 2013, 17 pgs.
U.S. Appl. No. 12/964,749, Office Action mailed May 23, 2013, 13 pgs.
U.S. Appl. No. 13/172,757, Amendment and Response filed Aug. 19, 2013, 14 pgs.
U.S. Appl. No. 13/172,757, Office Action mailed Apr. 19, 2013, 23 pgs.
U.S. Appl. No. 13/228,732, Office Action mailed Jul. 8, 2013, 16 pgs.
U.S. Appl. No. 13/228,818, Office Action mailed Jul. 18, 2013, 18 pgs.

(56) References Cited

OTHER PUBLICATIONS

U.S. Appl. No. 13/663,827, Advisory Action mailed Aug. 22, 2013, 3 pgs.
U.S. Appl. No. 13/663,827, Amendment and Response filed Apr. 29, 2013, 10 pgs.
U.S. Appl. No. 13/663,827, Amendment and Response filed Aug. 6, 2013, 7 pgs.
U.S. Appl. No. 13/663,827, Amendment and Response filed Sep. 9, 2013, 8 pgs.
U.S. Appl. No. 13/663,827, Notice of Allowance mailed Sep. 26, 2013, 11 pgs.
U.S. Appl. No. 13/663,827, Office Action mailed Jan. 29, 2013, 16 pgs.
U.S. Appl. No. 13/663,827, Office Action mailed May 7, 2013, 16 pgs.
U.S. Appl. No. 13/664,012, Amendment and Response filed Apr. 24, 2013, 10 pgs.
U.S. Appl. No. 13/664,012, Amendment and Response filed Jul. 30, 2013, 12 pgs.
U.S. Appl. No. 13/664,012, Notice of Allowance mailed Sep. 12, 2013, 14 pgs.
U.S. Appl. No. 13/664,012, Office Action mailed Jan. 25, 2013, 19 pgs.
U.S. Appl. No. 13/664,012, Office Action mailed Apr. 30, 2013, 16 pgs.
U.S. Appl. No. 11/182,989, Amendment and Response filed Dec. 1, 2011, 13 pgs.
U.S. Appl. No. 11/182,989, Amendment and Response filed May 29, 2012, 11 pgs.
U.S. Appl. No. 11/182,989, Amendment and Response mailed Oct. 19, 2009, 6 pgs.
U.S. Appl. No. 11/182,989, Amendment and Response mailed Oct. 29, 2010, 14 pgs.
U.S. Appl. No. 11/182,989, Amendment and Response mailed Nov. 26, 2008, 12 pgs.
U.S. Appl. No. 11/182,989, Amendment and Response mailed May 3, 2010, 14 pgs.
U.S. Appl. No. 11/182,989, Amendment and Response mailed Aug. 14, 2009, 11 pgs.
U.S. Appl. No. 11/182,989, Notice of Allowance mailed Jun. 21, 2012, 5 pgs.
U.S. Appl. No. 11/182,989, Office Action mailed Feb. 28, 2012, 20 pgs.
U.S. Appl. No. 11/182,989, Office Action mailed Sep. 1, 2011, 19 pgs.
U.S. Appl. No. 11/182,989, Office Action mailed Sep. 5, 2008, 6 pgs.
Vanwasi, "Unleashing the power of P2P"; Network Magazine India; Apr. 2002; 5 pgs.
Zhu, "The Simple and Protected Generic Security Service Application Program Interface (GSS-API) Negotiation Mechanism", RFC-4178, Oct. 2005, http://www.ietf.org/rfc/rfc4178.txt, 20 pgs.
U.S. Appl. No. 13/172,757, Amendment and Response filed Jul. 10, 2015, 17 pgs.
European extended Search Report in Application 12804233.0, mailed Jul. 15, 2015, 18 pgs.
European extended Search Report in Application 12830847.5, mailed Jul. 7, 2015, 11 pgs.
European Communication in Application 12830847.5, mailed Jul. 24, 2015, 1 page.
European Communication in Application 12805065.5, mailed Jun. 18, 2015, 1 page.
Chinese Notice of Allowance in Application 201110329007.4, mailed Jul. 1, 2015, 6 pgs.
Chinese 2nd Office Action in Application 201210434813.2, mailed Jun. 30, 2015, 7 pgs.
Chinese 2nd Office Action in Application 201210330725.8, mailed Jul. 1, 2015, 7 pgs.
U.S. Appl. No. 14/720,083, Office Action mailed Jul. 1, 2015, 28 pgs.
Chinese 1st Office Action and Search Report Issued in Chinese Patent Application No. 201280032558.7, Mailed Date: Aug. 5, 2015, 19 Pages.
U.S. Appl. No. 14/475,081, Office Action mailed Aug. 18, 2015, 17 pgs.
European Communication in Application 12804233.0, mailed Jul. 31, 2015, 1 page.
U.S. Appl. No. 14/720,083, Amendment and Response filed Sep. 16, 2015, 12 pgs.
Chinese 3rd Office Action in Application 201210331041.X, mailed Aug. 18, 2015, 7 pgs.
Indian Office Action in Patent Application No. 3306/DEL/2005, mailed Aug. 10, 2015, 2 pages.
European Notice of Allowance in Application 11846483.3, mailed Aug. 11, 2015, 7 pgs.
European Office Action in Application 12829430.3, mailed Oct. 6, 2015, 4 pgs.
Platform SDK: File Systems: Microsoft SMB Protocol and CIFS Protocol Overview http://msdn.microsoft.com/ library/default.asp?url=/library/ en-us/fileio/fs/ microsoft_smb_protocol_and_cifs_protocol_overview.asp; obtained online on Aug. 3, 2011, 1 pg.
Pawlowski, Brian et al. "The NFS Version 4 Protocol", Proceedings of the 2nd International System Administration and Networking Conference (SANE 2000). vol. 2. No. 5., 2000, 20 pgs.
Internet Assigned Numbers Authority, Well-Known Port Numbers, http://www.iana.org/assignments/port-numbers, obtained online on Oct. 5, 2006, 233 pgs.
CIFS or Public SMB Information on Common Internet File System http://support.microsoft.com/default.aspx?scid=kb;en-us;199072; obtained online Oct. 23, 2006, 2 pgs.
CIFS http://msdn.microsoft.com/library/en-us/cifs/protocol/cifs.asp?frame=true, obtained online Oct. 23, 2006, obtained online Oct. 23, 2006, 2 pgs.
U.S. Appl. No. 14/475,081, Amendment and Response filed Nov. 18, 2015, 14 pgs.
U.S. Appl. No. 13/172,757, Notice of Allowance mailed Nov. 12, 2015, 11 pgs.
Japanese Office Action in Application 2013-543293, mailed Nov. 4, 2015, 15 pgs.
Chinese Office Action in Application 201280032570.8, mailed Dec. 11, 2015, 15 pgs.
Chinese Notice of Allowance in Application 201210434813.2, mailed Oct. 10, 2015, 4 pgs.
Australian Office Action in Application 2012275906, mailed Jan. 11, 2016, 3 pgs.
Chinese 4$^{th}$ Office Action in Application 201210331041.X, mailed Jan. 20, 2016, 10 pgs.
Chinese 3rd Office Action in Application 201210330725.8, mailed Jan. 20, 2016, 11 pgs.
Israeli Communication in Application 231373, mailed Dec. 28, 2015, 3 pgs.
Singapore Notice of Allowance and Supplemental Examination Report in Application 11201400442S , mailed Jan. 26, 2016, 4 pgs.
U.S. Appl. No. 14/720,083, Notice of Allowance mailed Dec. 22, 2015, 8 pgs.
U.S. Appl. No. 14/720,083, Notice of Allowance mailed Jan. 11, 2016, 2 pgs.
U.S. Appl. No. 14/475,081, Office Action mailed Jan. 21, 2016, 18 pgs.
U.S. Appl. No. 13/172,757, Notice of Allowance mailed Jan. 21, 2016, 2 pgs.
U.S. Appl. No. 14/475,081, Amendment and Response filed Apr. 21, 2016, 12 pgs.
U.S. Appl. No. 14/475,081, Notice of Allowance mailed May 24, 2016, 5 pgs.
U.S. Appl. No. 13/172,757, Notice of Allowance mailed Mar. 31, 2016, 2 pgs.
U.S. Appl. No. 14/720,083, Notice of Allowance mailed Apr. 1, 2016, 2 pgs.
Chinese 2nd Office Action in Application 201280032558.7, mailed Mar. 28, 2016, 6 pgs.
Australian Office Action in Application 2011338485, mailed Mar. 18, 2016, 2 pgs.

(56) References Cited

OTHER PUBLICATIONS

Russian Notice of Allowance in Application 2013126471, mailed Feb. 29, 2016, 18 pgs.
European Notice of Allowance in Application 12804233.0, mailed Apr. 7, 2016. 7 pgs.
Japanese office Action in Application 2014-518599, mailed Apr. 14, 2016, 7 pgs.
Russian Notice of Allowance in Application 2013158710, mailed Apr. 5, 2016, 16 pgs.
European Notice of Allowance in Application 05111729.9, mailed Mar. 23, 2016, 7 pgs.
European Notice of Allowance in Application 10012923.8, mailed Apr. 5, 2016, 7 pgs.
European Notice of Allowance in Application 12829430.3, mailed Apr. 29, 2016, 7 pgs.
Russian Notice of Allowance in Application 2014108995, mailed Apr. 1, 2016, 13 pgs.
U.S. Appl. No. 14/475,081, Notice of Allowance mailed Jun. 7, 2016, 2 pages.
Australian Notice of Allowance in Application 2012275906, mailed May 24, 2016, 2 pages.
Japanese Notice of Allowance in Application 2014518599, mailed Jun. 17, 2016, 3 pages. (No English Translation.).
Japanese Office Action in Application 2014-529876, mailed May 24, 2016, 8 pages.
Isreal Office Action in Application 231373, mailed Jun. 21, 2016, 2 pages.
European Extended Search Report in Application 16159584.8, mailed Jul. 5, 2016, 11 pgs.
Chinese Notice of Allowance in Application 201210330725.8, mailed Jul. 13, 2016, 4 pgs.

* cited by examiner

DATA COMMUNICATION PROTOCOL

CROSS-REFERENCE TO RELATED APPLICATIONS

The present application is a continuation of United States Application Ser. No. 13/663,827 filed Oct. 30, 2012, now U.S. Pat. No. 8,825,885 issued Sep. 2, 2014, which is a continuation of United States Application Ser. No. 11/182, 251 filed Jul. 15, 2005, now U.S. Pat. 8,332,526 issued Dec. 11, 2012, which claims priority to U.S. provisional patent application Ser. No. 60/685,008, filed May 25, 2005, and herein incorporated by reference. The present application is related to copending United States patent application entitled "Data Communication Coordination with Sequence Numbers"U.S. Application Ser. No. 11/182,989, filed concurrently herewith, now U.S. Pat. No. 8,316,129 issued Nov. 20, 2012, assigned to the assignee of the present invention, and hereby incorporated by reference.

BACKGROUND

Many data communication protocols that are still in use today, such as the SMB (Server Message Block) protocol, were developed at a time when computing resources were very different, e.g., network bandwidth was typically limited and memory was very precious. As a result, when used in contemporary networks, such protocols may limit overall performance. For example, because of having been designed when memory was limited, small buffer sizes are used, requiring more round trips to communicate large amounts of data.

Moreover, the existing SMB protocol has other limitations that have become apparent over time. For example, the existing SMB protocol is susceptible to denial of service attacks; the design of the protocol makes it difficult to fight these attacks. Likewise, the method for ensuring packet security is cumbersome. Also, there is no current mechanism for performing quality of service-like operations, in that a trusted client, for example, obtains the same server resources as an untrusted client.

Although various revisions, or dialects, of the SMB protocol have been developed over time, each those dialects are essentially patch-based approaches that tweak various parts to add some additional features. Thus, extensibility is not straightforward. In sum, while still a frequently-used and valuable protocol, existing SMB versions are less than ideal when used with contemporary network resources.

SUMMARY

Briefly, various aspects of the present invention are directed towards a data communication protocol, which a client and server use for communication, such as for file sharing. The client sends a negotiation packet to a server that identifies a set of protocol dialects the client understands. The packet is in a format such that without requiring another request, a server incapable of communicating via the second data communication protocol will indicate the first communication protocol should be used. If the server is capable of communicating via the second data communication protocol, it will respond as such. The client will invoke a driver that handles communication with the server via the corresponding protocol indicated by the server. In one example implementation, the second communication protocol is SMB 2.0 or greater.

Other aspects and enhancements of the protocol may include a create command with additional context data attached, and a compound command comprising a plurality of related commands or unrelated commands. Still other aspects and enhancements include a multi-channel command related to requesting data transfer on a separate data channel, a signed capability verification request to ensure that a secure connection is established, and the ability to transfer extended error data from the server in response to a request.

When a server receives a compound request, the server determines whether the compound request contains unrelated commands or related commands. When the compound request contains unrelated commands, each request is handled as a separate request, otherwise, when the compound request contains related commands, each request is handled sequentially. When the related commands including a create/open command, the file handle from the create/open command is used for each subsequent related command at the server, e.g., without needing to wait for the handle back from the client.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
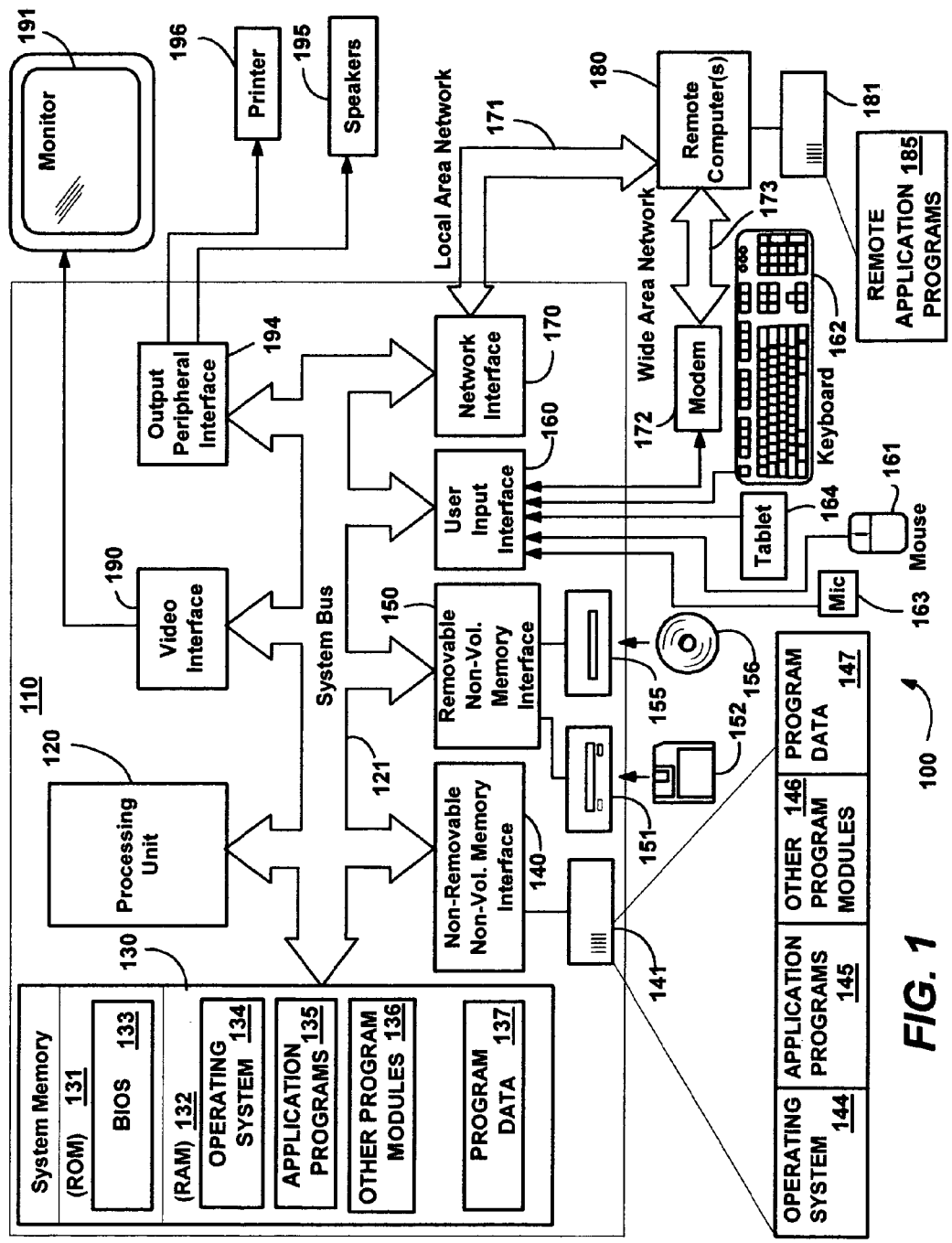
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, one of variety of network appliance devices, such as print servers or printers themselves, as well as NAS storage devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like.

Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Communication Protocol

Various aspects of the technology described herein are directed towards a data communication protocol, such as a later version (2.x or greater) of the SMB protocol. In one example implementation generally described herein, the SMB protocol is used for file data transfer. However, as can be readily appreciated, the present invention is not limited to file data, let alone any particular implementation or examples described herein. Instead, numerous ways to implement the present invention are feasible, including for use in communication with printers, named data pipes, generic devices and so forth. As such, the present invention is not limited to any of the particular file-based examples used herein, but rather may be used numerous ways that provide benefits and advantages in computing in general.

Other various aspects of the technology described herein are directed towards a new revision of SMB upon which file-server interaction may be built. As will be understood, a more lightweight protocol is provided that supports existing (up-level) functionality, along with being more scalable and easier to update with new features.

Figure 2:
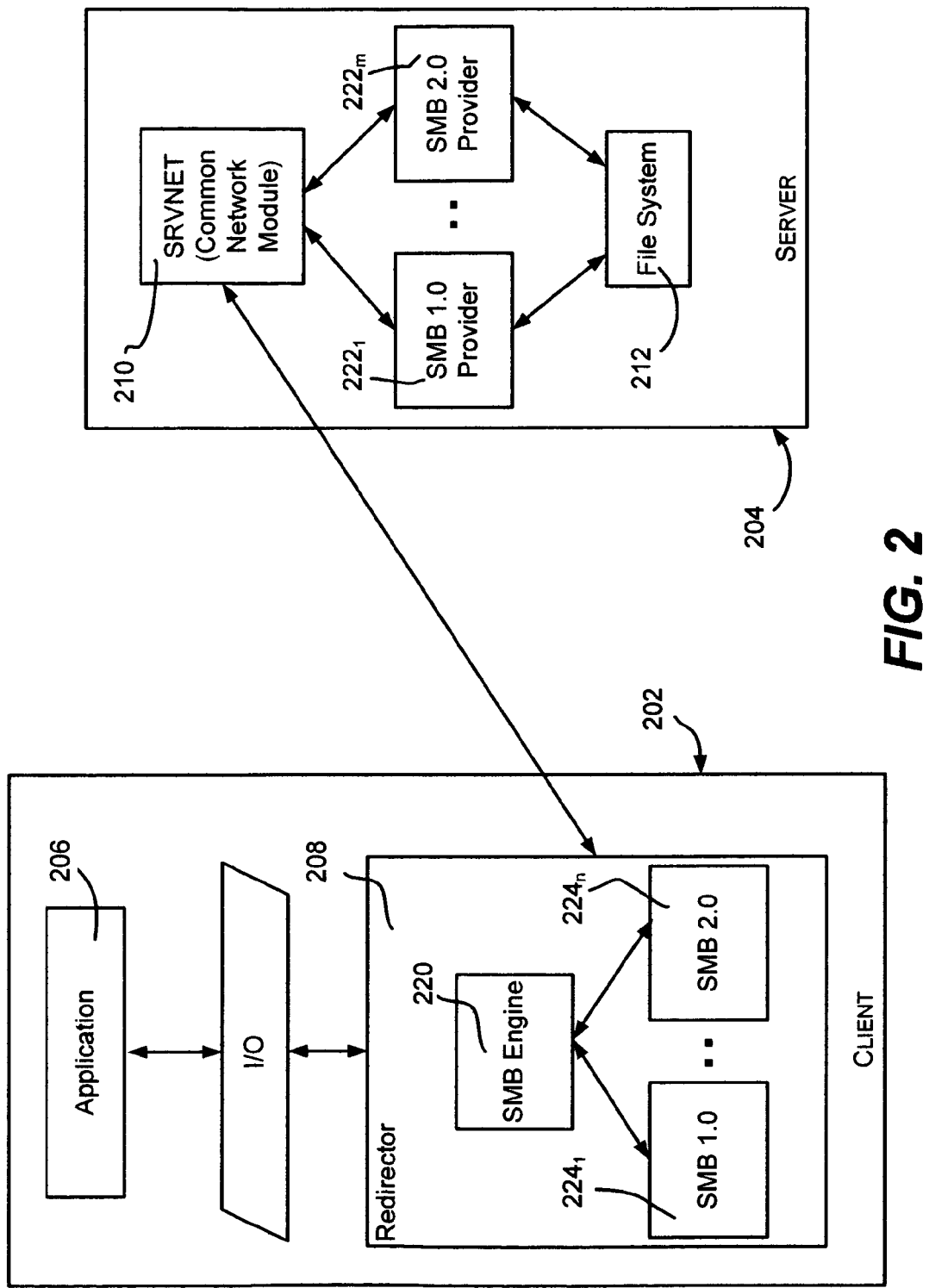
FIG. 2 is a block diagram representing an example network environment in which a client communicates with a server in accordance with various aspects of the present invention.

Turning to FIG. 2 of the drawings, there is shown a block diagram representing an example networking environment in which a client 202 communicates with a server 204 through one or more communication channels. Although the functions and components of the client machine 202 and the server 204 are described as being located within two separate computers, such as the main computer system 110 and remote computer system 180 of FIG. 1, the components of these two computers or the functions performed thereby may be provided on one machine, or may be distributed over a number of computers.

Network file system commands from an application program 206 are handled by a client redirector component 208, which communicates with a counterpart common network module (SRVNET) 210 to carry out the commands on the file system 212. Before such commands are processed, a communication protocol that the client and server agree upon, generally the most recent version/dialect that both understand, is negotiated.

Figure 3:
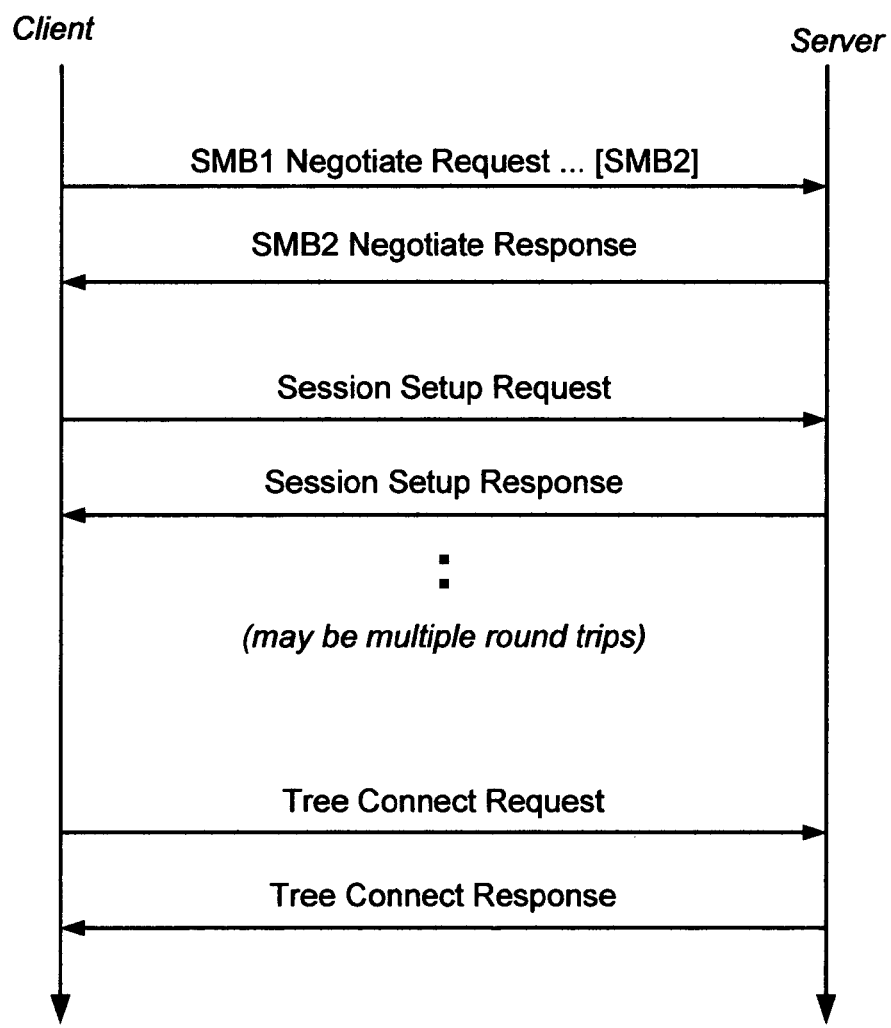
FIG. 3 is a timing diagram representing an example negotiation and session setup between a client and server in accordance with various aspects of the present invention.

In general, the client 202 establishes a connection and then negotiates with the server 204 to ultimately set up a session, as generally represented in FIG. 3. While a client may directly indicate to a server that it is an SMB 2.x client, (wherein as used herein, the number 2.x represents any newer version relative to existing SMB 1.x versions), a client may also negotiate via a backwards-compatible negotiation packet. In this way, a client can also communicate with a server that is only SMB 1.x capable, yet do so without needing to set up a separate connection should an attempt at a higher-level negotiation fails. At the same time, the code for implementing each protocol may be packaged into its own independent driver.

In one example implementation, a client SMB engine component 220 provides a packet to a server (e.g., the server 204) that indicates that the client 202 is negotiating at least an SMB 1.0 session. For a client 202 that speaks both the SMB1 dialects and the new SMB2 revision of the protocol, the client may send a traditional SMB1 negotiate packet, but that further contains an indication that this packet is actually requesting SMB 2.x, if available. An SMB2-capable server will detect this request and respond with an SMB2 negotiate response. More particularly, to indicate that the client 202 is capable of SMB 2.x, the SMB 1.0 negotiation packet includes a set of dialect strings, one of which indicates that the client is also capable of SMB 2.x communication.

The client 202 thus sends an initial negotiate that includes the minor revision numbers that the client 202 supports. One current revision is 0 (zero), i.e., SMB 2.0; in the future, a client may claim to support any subset of the dialect revisions.

When the server 204 receives the packet, it will respond based on its capabilities. A server 204 may respond with an SMB 1.0 negotiation response, along with any 1.x dialect information, or if capable of SMB 2.x communication, will respond with an SMB 2.0 negotiation response. A particular SMB dialect revision may also be returned that matches one of the dialect strings, ordinarily the largest numbered version that the server 204 can handle among the dialect versions that the client 202 provided.

To this end, once the server 204 knows which dialect revisions the client 202 speaks, it compares these to the revisions that the server 204 understands, and returns the preferred common dialect revision (which will usually be the highest). For example, if the server supports dialects 1-8, but the client only supports 1, 2 and 4, the server will return 4. This gives the client 202 a clear understanding of which commands it will be able to send to the server 204. To select which dialect to use, the SRVNET module 210 essentially starts a negotiation, handing the packet to each SMB provider $222_1$-$222_m$ that it has, from highest to lowest in order with respect to versions/dialects, until one SMB provider agrees to handle this communication session based on the packet contents. Thereafter, communications on this connection are routed to that provider, in this example the SMB 2.0 provider $222_m$.

At the client end, the SMB engine component 220 receives the response, and based on the version/dialect information in the response, knows which client SMB component $224_1$-$224_n$ to use to communicate with the server. In this manner, both the client 202 and server 204 agree on which SMB dialect to use for a given session. Note that a client may have multiple SMB components $224_1$-$224_n$ running at the same time, each a different version/dialect, whereby, for example, a client may be communicating with one server over SMB 1.x at the same time the client is communicating with another server over SMB 2.x.

The server 204 also returns other information to the client, including a security mode which tells the client 202 whether the server 204 will require security signatures. Note that previously, security signatures were available, however the first few (e.g., capabilities negotiation) packets were in the clear, whereby an attacker could force a client into a lower-level protocol in which the attacker knows its vulnerabilities.

Figure 7:
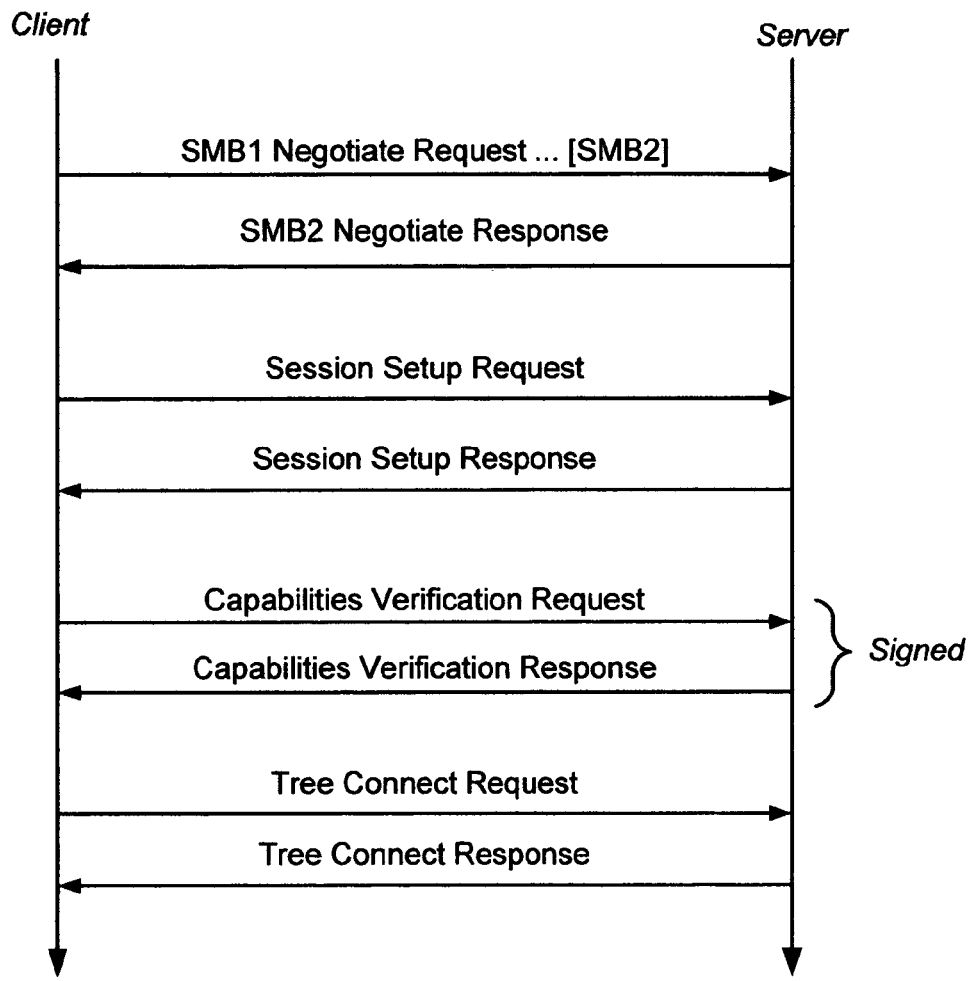
FIG. 7 is a representation of verification of a secure connection, in accordance with various aspects of the present invention.

Secure connect operates by providing another, capabilities verification round-trip that is signed, (regardless of whether signing is enabled or not). FIG. 7 shows such a request/response following session setup. Other information can be put in the packet, such as an IP address, so that the server can actually verify that it, and not another entity, responded. Signing can be turned off if IPSEC or any other form of network security is active.

The server 204 may return capabilities bits for the server, e.g., whether the server is DFS (Distributed File System) aware, and whether it is LWIO (Lightweight IO) capable. The client 202 disregards any capability bits it does not understand, which may happen if the server 204 has a newer version than the client's corresponding version. Other information that may be returned in the negotiate exchange includes the server's unique ID, the maximum read/write size the server will accept, a data offset hint for faster write processing, the current system time of the server, and security information used to seed authentication in the case of extended security.

Session setup handles the authentication process for a new session, which may be a multiple round-trip event. The client 202 queries the local security system for a security blob to send over the network, and sends the first session setup, filling in the capabilities, the maximum size fields, and a VcNumber, described below. The server 204 receives this blob and gives it to the security system. If the server 204 determines that more information is needed, it will return its own security blob with the error code STATUS_MORE_PROCESSING_REQUIRED. The client 202 passes this blob back to the local security system, and the process will repeat until a failure occurs or authentication is successful.

The VcNumber tells the server 204 whether there may be other connections established from this same client 202. If this is zero, the server 204 assumes no other connections have been made from this client, and will tear down any such connections it finds (assuming them to be stale). If the VcNumber is one or more, the server 204 will not tear down any existing connections.

The Channel tells the server 204 that this client 202 is attempting to establish another connection with an existing session. The session can be identified by the user/computer pair from which this session setup was received. The channels share the same TreeId/UserId/ProcessId/FileId information. For a channel authentication, the authentication blob may be a challenge-response that is encrypted across the first channel and sent back out across the second channel to allow the client 202 and server 204 to mutually authenticate each other. On a successful response, the server 204 will also notify the client 202 if it has been authenticated as Guest or as a Null user, if either is applicable.

Once a session is set up, the client 202 may perform data transfer using the various commands described below, including create, read, write and close, as well as perform file locking and directory-related operations. As described in the aforementioned "Data Communication Coordination with Sequence Numbers" patent application, when using these commands, the server is able to control the client's use of server resources. Also, the protocol provides a number of efficiency improvements with respect to what information is communicated, and how it is communicated.

Figure 4:
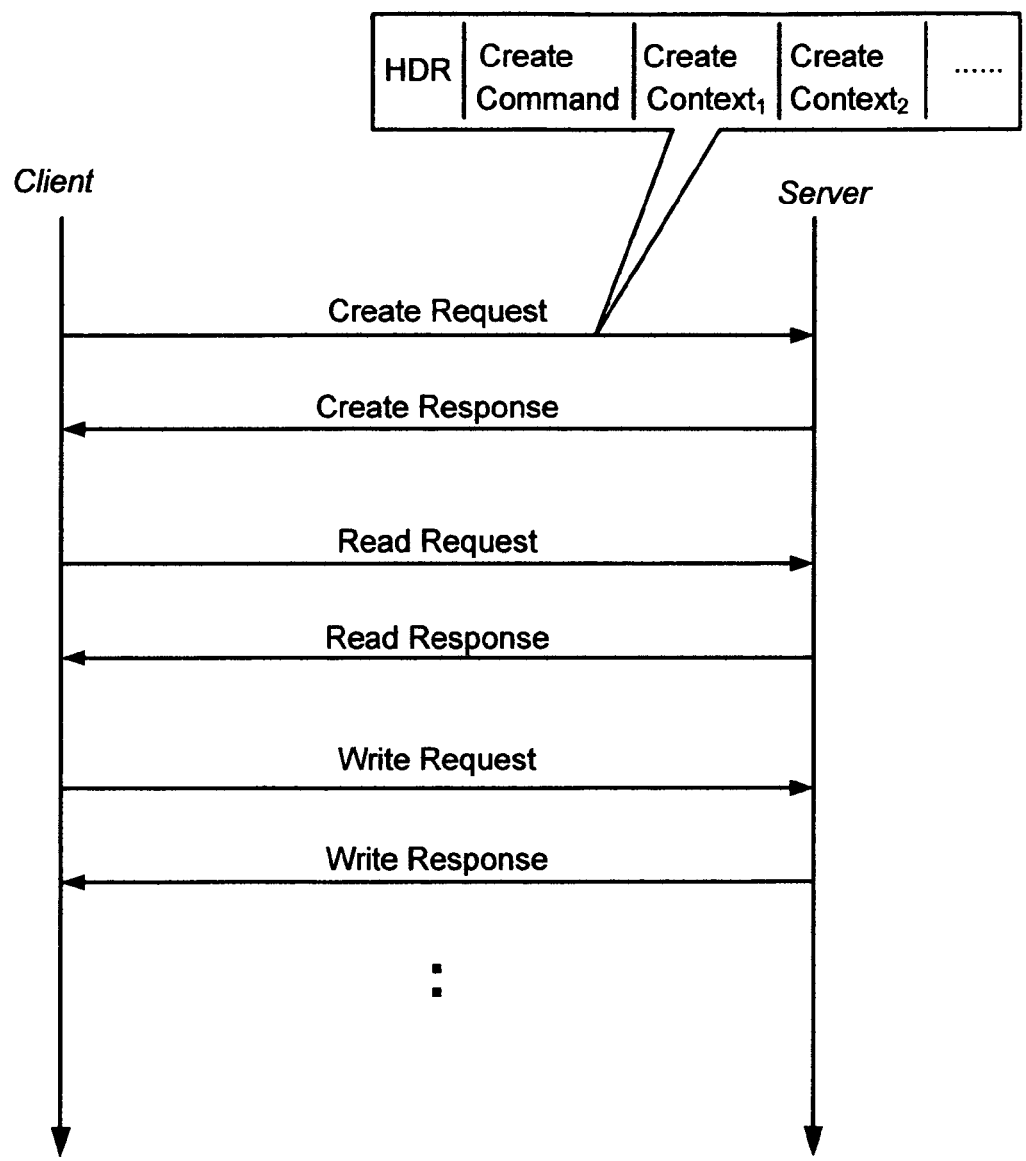
FIG. 4 is a timing diagram representing various commands including a create command with create contexts in accordance with various aspects of the present invention.

As generally represented in FIG. 4, the create command has been extended to allow context information to be attached to the command; in general, the context information comprises arbitrary extra create parameters that are tagged to the create command. For example, a transaction identifier for a transactional file system-related create command may be attached. As long as the server understands the extra context information, the server can be informed of the extended information, (note that servers will ignore extra data that they not understood), and return information associated with the context. As can be readily appreciated, this provides for additional functionality without changing the protocol, essentially providing built-in extensibility.

Command IDs and dialect revision numbers are provided for in a new SMB header, set forth below. The header has a USHORT for the command field as opposed to a UCHAR; by using the first byte of this USHORT to denote the dialect, and the latter byte to denote the command, the command table is well defined for existing commands, with a large proportion open for later expansion. In general, the client may maintain a table for each dialect that contains the pointers to the function to issue a given command. For a client with a single dialect supported, the table would be as set forth below:

| Command | Dialect #1 |
|---------|------------|
| Create  | SmbCreate1 |
| Read    | SmbRead1   |
| Write   | SmbWrite1  |
| Close   | SmbClose1  |

For caching functionality, more information may be retrieved from the file on Close. As such, a new Close command is provided to support this new functionality. Now the client supports two dialects, and the table is as set forth below:

| Command | Dialect #2 | Dialect #1 |
|---------|------------|------------|
| Create  | SmbCreate1 | SmbCreate1 |
| Read    | SmbRead1   | SmbRead1   |
| Write   | SmbWrite1  | SmbWrite1  |
| Close   | SmbClose2  | SmbClose1  |

Note that most of the functionality stayed the same, except for the changed Close command. Also, the client can now talk to Dialect 2 servers and use the new functionality, but for Dialect 1 servers it still uses the old functionality. There are no changes to the communicating with Dialect 1 servers.

As technology evolves, new network hardware becomes available, such as capable of performing relatively much larger reads and writes. For this release, Dialect #3 is provided, whereby the table is enlarged as follows:

| Command | Dialect #3 | Dialect #2 | Dialect #1 |
|---------|------------|------------|------------|
| Create  | SmbCreate1 | SmbCreate1 | SmbCreate1 |
| Read    | SmbRead3   | SmbRead1   | SmbRead1   |
| Write   | SmbWrite3  | SmbWrite1  | SmbWrite1  |
| Close   | SmbClose2  | SmbClose2  | SmbClose1  |

A client with such a table can speak the three dialects, and will take advantage of the functionality that is available in each dialect. Some advantages of using this method include that each SMB command can be mapped back to the dialect it was introduced into, because the command is made of (Dialect Command). This makes it easy to determine when commands were introduced, and what servers support them. If the functionality for a given command is not changed in a new dialect, the code does not change. If the functionality is changed, the down-level interface code does not change, but rather new code is added to support the new functionality.

On the server side, a server dispatch table becomes a double switch between (Dialect) and (Command). This allows for logically separating the new functionality in the code, making it easier to understand and change.

Turning to one aspect of the protocol that provides efficiency, multiple commands may be compounded into a single packet, (or some lesser number of packets). Complex tasks may thus be performed in a manner that reduces the number of round trips between the client 202 and server 204. By way of example, a compound request packet may contain a command to create/open a file, a command to write to the file and a command read from the file. Compounding thus works with related operations, (e.g., having the same file handle) and also provides for unrelated operations to be combined.

Figure 5:
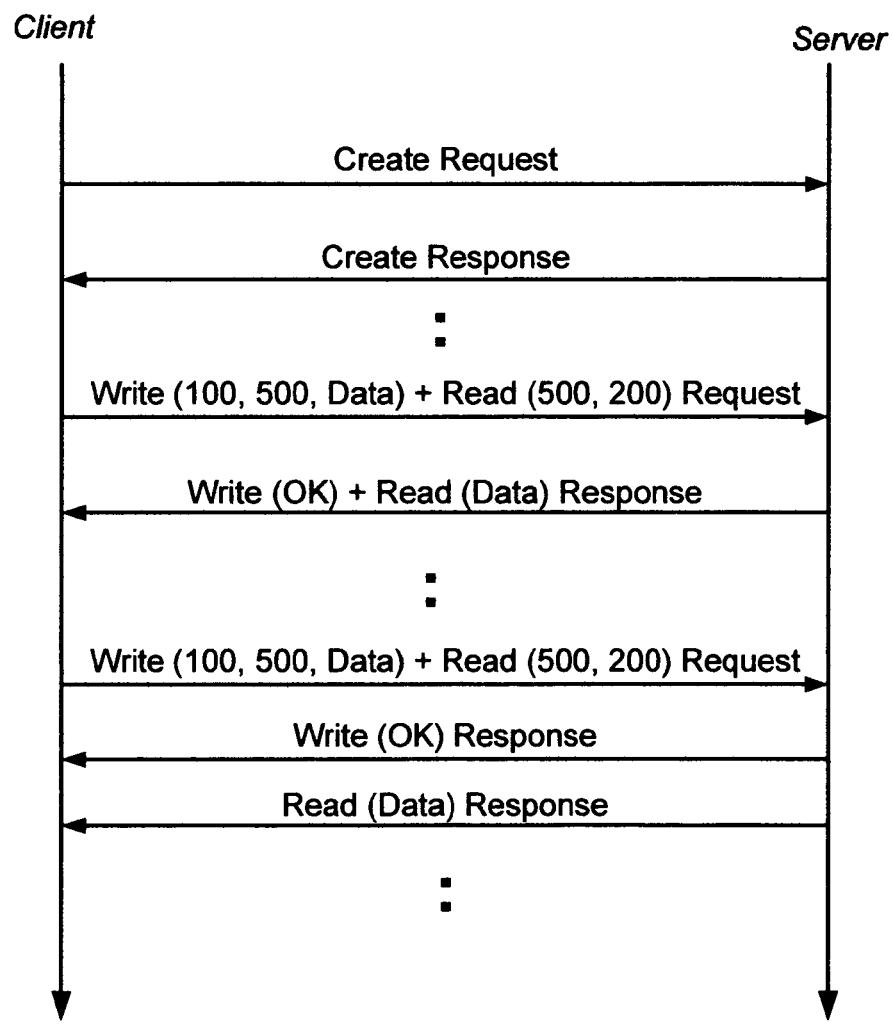
FIG. 5 is a timing diagram representing compound requests and possible responses between a client and server, in accordance with various aspects of the present invention.

An example of compounding related requests is generally represented in FIG. 5, where (in contrast to FIG. 4, for example) a single request can handle a write and read, providing the appropriate parameters. Note that as represented in FIG. 5, a single request may receive a compound response and/or individual responses, depending, for example, on when they complete. More complex requests, such as create/open, read, write and close may be in a single request. This is accomplished by marking a packet as having related operations; the server will know that the file handle it receives following the create/open applies to the other commands in the compound request. Note, however, that related compound requests are handled in the order they are packaged, and thus it is up to the client to ensure they are ordered correctly before sending.

Compounding in SMB2 is simpler than the complex rules that existed in SMB1. To this end, the SMB2 HEADER (detailed below) contains a "NextOffset" that is used to identify the offset of the header of the next command from the header of the current command. Each command has its own SMB2_HEADER, including a separate MessageId. The server response or responses may come as a single compounded response, or as separate responses, as represented in FIG. 5. In the event of a failure, the response would be the same as any other failed command.

For unrelated messages, the commands will always be processed as if they were received separately. This allows a redirector or intermediate component to automatically compound packets that are unrelated. A delay may be used to obtain packets to compound, particularly if the delay time is small relative to the round-trip time. Because the server treats them as received separately, the server need not be otherwise modified to unpack such compound unrelated requests. The entity that performed the compounding may have to separate any compound responses, however, since the server may combine otherwise separate responses.

The related mode allows the client to send a series of commands that are to be executed in sequence with the result of one command potentially being used in the next command. Such commands share the same Session/Process/Tree/File ID, they will be executed sequentially, and will stop processing on the first error. If there were other commands to process after the failure, the operations are immediately failed with STATUS_NOT_PROCESSED. An example of how this may be used is to pair a Session Setup with a Tree Connect. If the session fails to be established, the tree connect will never be attempted and will fail with STATUS_NOT_PROCESSED. If the session setup succeeds, the tree connect is done using the SessionId from the session setup command. The same method could be used to do a Create followed by a QueryFileInformation, or even a Create-Read-Close set.

Conditional and implied compounding are also feasible. For example, a conditional compound command may be sent, such as open and also read if the file is less than 64 KB, thus opening and automatically obtaining small files in one round trip, but only opening large files. Implied compounding, such as automatically returning directory enumeration data in response to an open directory request, even if not expressly requested, may also cut down round trips. The benefits and advantages to such enhanced compounding increase in high-latency networks.

Figure 6:
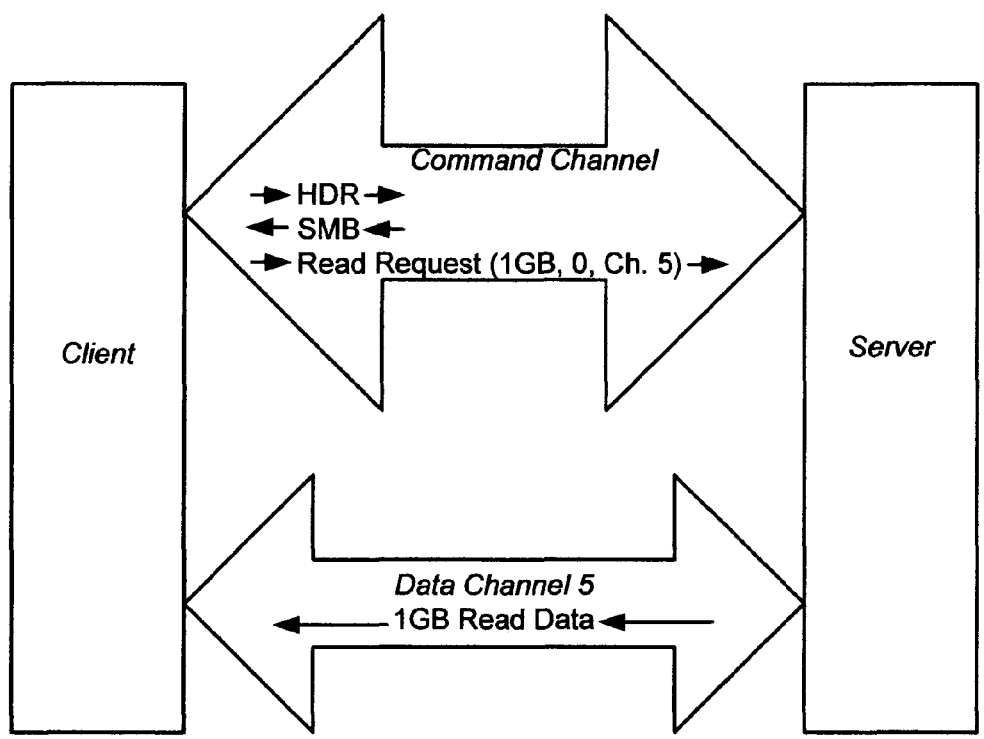
FIG. 6 is a representation of client-server communication over multiple channels, in accordance with various aspects of the present invention.

Another way in which the protocol facilitates improved efficiency is via multiple channel communication. Between a client and server, a transport connection for commands may be used, with a command that specifies an alternate channel to stream data. For example, a read request may specify the offset and length as well as an alternate channel to read data into; a write request operates similarly. FIG. 6 shows an example of a 1 GB read request starting from offset 0 and requesting the data to be streamed to data channel 5.

Streaming data on an alternate channel provides a number of benefits, includes eliminating the need to include and process packet headers. The client can pre-post a buffer and have the data streamed therein, eliminating the need to copy from one buffer to another as in conventional single-channel communication. Fairness is another benefit, in that, for example, one request on the control channel will not have to wait for a large amount of data (e.g., 5 GB) to complete be transmitted before that other request is handled, because the 5 GB will go over the data channel.

As multiple NIC's are becoming more common, the protocol takes advantage of any available network bandwidth. This includes working across multiple connections for the same session, regardless of the transport (or NIC) on which they are established. Specialized hardware may be employed.

Thus, with SMB 2.x, a session is not bound to a connection. Instead, multiple "channels" may be established that exist across different physical connections. Sessions can exist on each of these connections, and the IDs used to refer to files and processes are common across channels. This allows for having a normal channel for doing namespace operations and creates, but using specialized network hardware for reads and writes when available. Still further, small network glitches may not result in lost data, because as long as one channel remains open to a session, the session stays alive. Various implementation details are described herein with reference to the Session Setup command and the Read/Write commands.

By way of example, consider a client that establishes a connection over simple TCP to the server over an enterprise's public network. This is the first connection, so it is always channel 0. Once both sides detect that they have a private network for doing data transfers, (e.g., each has a gigabit card), the client and server may establish a second connection over this card, as channel 1. While the client is browsing some files, the directory queries are being sent over channel 0, while the data is being sent over channel 1. If the client wants to browse into some directories that are encrypted on the server, when the client requests the data, the redirector realizes that the data is sensitive, so it establishes a new channel (channel 2) to the server that has IP Sec (IP security) active on it. When the client requests the sensitive data, it will ask it be sent over channel 2, while normal less-sensitive data could continue to come over channel 1 (as it is faster).

As can be readily appreciated, the opportunity for QoS and security improvements, along with the simple bandwidth gain, provides significant benefits. Note that on a channel read/write, the server/client can lay down the receive buffer before any data is read, so the mechanism can further eliminate the need to copy out of the data movement, which can also improve server/client scalability.

Figure 8:
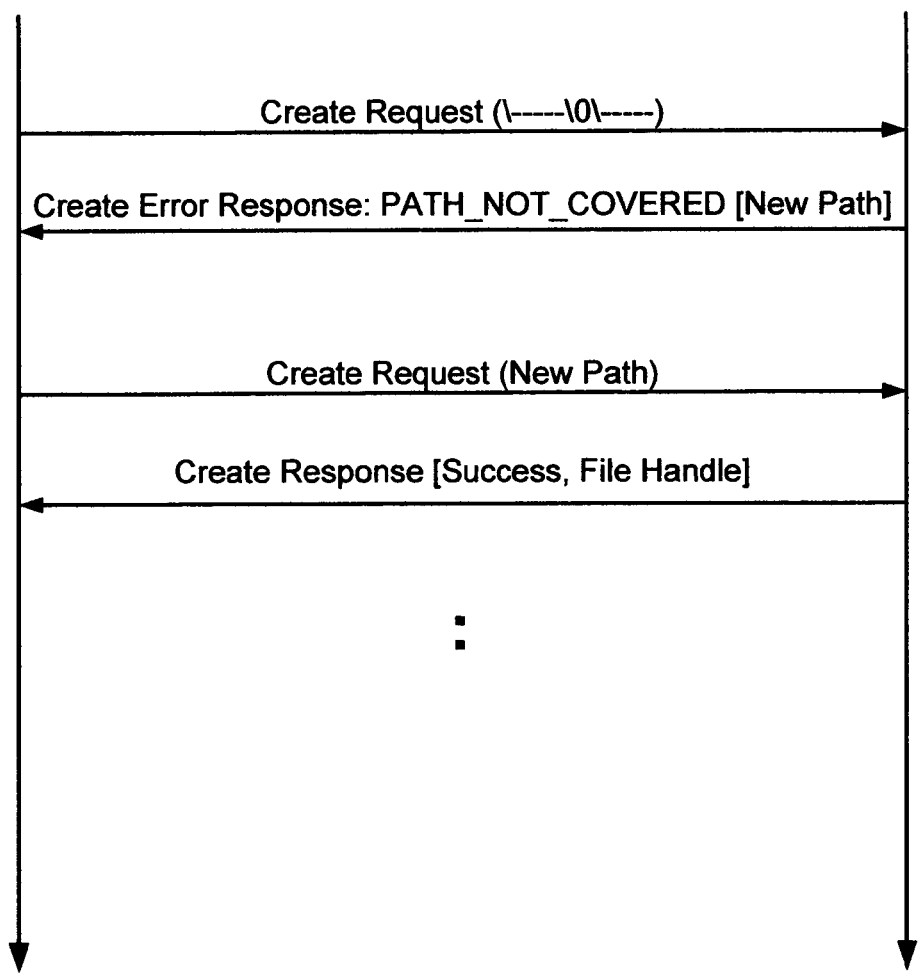
FIG. 8 is a representation of extended error return information using an example based upon symbolic links, in accordance with various aspects of the present invention.

Further, SMB error packets are allowed to be tagged with arbitrary data. Thus, a description of why something failed, which may provide value. Symbolic link evaluation is one example where tagging with arbitrary data provides a client with useful information, as generally represented in FIG. 8. Essentially, a client create request may fail by asking for a path that is actually a symbolic link to another path. Instead of simply failing the request, information providing the new path allows the client to change to a reparse path, which will ultimately succeed; note that iteration over a number of requests may be required to find a path that will succeed.

Example Protocol Definition

The new header is a 64-byte structure (e.g., twice the size of one current structure).

```
typedef struct _SMB2_HEADER {
    UCHAR        Protocol[4];      // Contains 0xFE,'S','M','B'
    USHORT       StructureSize;    // = sizeof(SMB2_HEADER).
                                   // (versioning)
    USHORT       Epoch;            // incremented every time the
                                   // server restarts
    NTSTATUS     Status;           // Status of the command
    USHORT       Command;          // The command for this packet
                                   // union
    {
        USHORT   CreditsRequested; // On client send, request for
                                   // more credits
        USHORT   CreditsGranted;   // On server response, credits
                                   // granted to client
    };
    ULONG        Flags;
    ULONG        Reserved;
    UINT64       MessageId;        // Identifies this message
                                   // send/response
    union
    {
        struct
        {
            UINT64   ProcessId;    // Process identifier
            UINT64   SessionId;    // Session identifier
            ULONG    TreeId;       // Tree Connect identifier
        };
        struct
        {
            UINT64   AsyncId;      // Used to identify long standing
                                   // commands
        };
    };
    UCHAR        Signature[8];     // Signature for the packet
    ULONG        NextCommand;      // Offset from to next
} _SMB2_HEADER, *PSMB2_HEADER;
```

Protocol is simply the protocol identifier, to identify the packet. For the existing SMB implementations, this consists of {0xFF, 'S', 'M', 'B'}. For the new protocol this shall be {0xFE, 'S', 'M', 'B'}.

StructureSize identifies the size of the SMB2 HEADER structure, and will be used for minor versioning within the Header itself, if other changes are introduced later on.

Epoch represents the "version count" of a server. This is incremented when a server is cycled (or the server service is stopped and started) to indicate to the client whether the server might have maintained state across a disconnect. This is for future use with persistent handles, and can be considered "Reserved" for the time being.

Status gives the error status for a given operation, as in the existing SMB implementation.

Command identifies the command for the packet, as described herein.

CreditsGranted/CreditsRequested are used by the client on a send to request more credits, and by the server on the response to grant more credits within the new credit management scheme, as described in the related patent application entitled "Data Communication Coordination with Sequence Numbers."

Flags related to the message include:
define          SMB2_FLAGS_SERVER_TO_REDIR    0x00000001

When present, indicates the message is a response as opposed to a request define          SMB2_FLAGS_ASYNC_COMMAND    0x00000002

On response, the server returns STATUS_PENDING with this flag set to indicate that we are processing it asynchronously.

define    SMB2_FLAGS_RELATED_OPERATIONS    0x00000004

Set on a client message send of a compounded message to indicate that the operations are related, so the file opened in the Create is used as the FileId for later operations.

define SMB2_FLAGS_SIGNED 0x00000008

Set when the packet has been signed. The receiver should verify the signature. The key used for signing is based on the session that sent the packet.

define          SMB2_FLAGS_DFS_OPERATION    0x10000000

This is a DFS operation. The server should allow DFS to munge the name. This could be replaced with a create option.

MessageId Identifies a message being sent with its response.

ProcessId describes the client-side identification of the process issuing the command.

SessionId identifies the established session for the command, or 0 if no session is being used.

TreeId Identifies the tree connect for the command, or 0 if no tree connect is being used.

AsyncId: as described in the related patent application entitled "Data Communication Coordination with Sequence Numbers," message IDs are actually sequence numbers, and the window of available sequence numbers is always set to slide to the right. A command that will run for an extremely long time (such as a named-pipe read or change-notification, or a create that pends on an oplock break, any of which can block indefinitely) may hold up the ability of the window to slide. To work around this issue, the server can optionally respond to any command with STATUS_PENDING and setting the SMB2_FLAGS_ASYNC_COMMAND flag mentioned above and providing a unique identifier in place of the Session/Tree/ProcessId. This means the client can continue sliding the window as if it received a response. At some point later, the true response will come with a matching AsyncId (and CommandId) to satisfy the request. In the event that the client wants to cancel such a command, the client sends a cancel with the flag set and the matching AsyncId.

The security signature is the same as in the previous protocol, except that there is no longer a hidden index number. The index is not necessary with the use of sequence numbers for the MID. (This prevents replayability directly). This allows the use of security signatures without forcing the operations to be sequenced on their way to the transport.

NextCommand is the offset of the next command in the message from the beginning of this header. Messages should be quad-aligned. The use of the SMB2_FLAGS_RELATED_COMMAND allows various abilities for compounding, as described above.

Command Formats

Negotiate

As described above, the client and server exchange negotiate request and response as part of the handshake that helps them determine each other's capabilities.

Format

```
%define SMB2_NEGOTIATE_SIGNING_ENABLED      0x01
#define SMB2_NEGOTIATE_SIGNING_REQUIRED     0x02
#define SMB2_GLOBAL_CAP_DFS                 0x00000001
#define SMB2_GLOBAL_CAP_LWIO                0x00000002
#define SMB2_GLOBAL_CAP_TXF                 0x00000004
#define SMB2_GLOBAL_CAP_CSE                 0x00000008
typedef struct _SMB2_REQ_NEGOTIATE
{
    USHORT StructureSize;        // = sizeof(SMB2_REQ_NEGOTIATE)
    USHORT Reserved;             // = 0
    ULONG DialectCount;          // Number of dialects we support
    USHORT Dialects[ ];          // Array of dialect revision
                                 // numbers.
} SMB2_REQ_NEGOTIATE, *PSMB2_REQ_NEGOTIATE;
typedef struct _SMB2_RESP_NEGOTIATE
{
    USHORT StructureSize;        // = sizeof(SMB2_RESP_NEGOTIATE)
    USHORT SecurityMode;         // = signing flags
    USHORT DialectRevision;      // Server selected dialect from
                                 // received list
    USHORT Reserved;
    GUID ServerGuid;             // Server generated GUID
    ULONG Capabilities;          // Global server capability flags
    ULONG MaxTransactSize;       // Largest transact buffer we will
                                 // accept or send
    ULONG MaxReadSize;           // Largest size read supported
    ULONG MaxWriteSize;          // Largest size write supported
    UINT64 SystemTime;           // System (UTC) time on the server
    USHORT EncryptionKeyOffset;
    USHORT EncryptionKeyLength;
    USHORT SecurityBufferOffset;
    USHORT SecurityBufferLength;
    UCHAR Buffer[1];
} SMB2_RESP_NEGOTIATE, *PSMB2_RESP_NEGOTIATE;
```

Session Setup

As described above, Session Setup handles the authentication process for a new session.

---
Format
---

```
typedef struct _SMB2_REQ_SESSION_SETUP
{
    USHORT StructureSize;         // = sizeof(SMB2_REQ_SESSION_SETUP)
    USHORT VcNumber;              // 0 = first connection, nonzero =
                                  // additional
    ULONG Capabilities;           // Capabilities of the client.
    ULONG Channel;                // nonzero = binding new channel to
                                  // session
    USHORT SecurityBufferOffset;
    USHORT SecurityBufferLength;
    UCHAR Buffer[1];              // Security buffer
} SMB2_REQ_SESSION_SETUP, *PSMB2_REQ_SESSION_SETUP;
#define SMB2_SESSION_FLAG_IS_GUEST  0x0001
#define SMB2_SESSION_FLAG_IS_NULL   0x0002
typedef struct _SMB2_RESP_SESSION_SETUP
{
    USHORT StructureSize;         // =
                                  // sizeof(SMB2_RESP_SESSION_SETUP)
    USHORT SessionFlags;
    USHORT SecurityBufferOffset;
    USHORT SecurityBufferLength;
    UCHAR Buffer[1];              // Security buffer
}
```

Logoff

Logs off an existing session.

---
Format
---

```
typedef struct _SMB2_REQ_LOGOFF {
    USHORT StructureSize;
    USHORT Reserved;
} SMB2_REQ_LOGOFF;
typedef struct _SMB2_RESP_LOGOFF {
    USHORT StructureSize;
    USHORT Reserved;
} SMB2_RESP_LOGOFF;
```

This command tears down the session with the SessionId specified in the header. Open files are closed, and other existing structures (tree connects, etc.) are torn down. No more operations can be processed for the given SessionId.

Tree Connect

Creates a tree connection to a shared resource on the server machine.

---
Format
---

```
typedef struct _SMB2_REQ_TREE_CONNECT
{
    USHORT StructureSize;   // = sizeof
                            // (SMB2_REQ_TREE_CONNECT)
    USHORT Reserved;
    USHORT PathOffset;      // Full path (i.e. \\SERVER\SHARE)
    USHORT PathLength;
    UCHAR Buffer[1];
} SMB2_REQ_TREE_CONNECT,
*PSMB2_REQ_TREE_CONNECT;
#define SMB2_SHAREFLAG_MANUAL_CACHING  0x00000000
#define SMB2_SHAREFLAG_AUTO_CACHING    0x00000001
#define SMB2_SHAREFLAG_VDO_CACHING     0x00000002
#define SMB2_SHAREFLAG_NO_CACHING      0x00000003
#define SMB2_SHAREFLAG_CACHING_FLAGS   0x00000003
// Reserved share cap 0x00000001
// Reserved share cap 0x00000002
// Reserved share cap 0x00000004
```

---
-continued

Format
---

```
#define SMB2_SHARE_CAP_DFS       0x00000008  // This is a
                                              DFS share
#define SMB2_SHARE_TYPE_DISK                 0x01
#define SMB2_SHARE_TYPE_PIPE                 0x02
typedef struct _SMB2_RESP_TREE_CONNECT
{
    USHORT StructureSize;   // = sizeof
                            (SMB2_RESP_TREE_CONNECT)
    UCHAR ShareType;
    UCHAR Reserved;
    ULONG ShareFlags;
    ULONG Capabilities;
} SMB2_RESP_TREE_CONNECT,
*PSMB2_RESP_TREE_CONNECT;
```

The client issues this command to the server to establish a tree connection. The Path is of the form \\server\share and is filled into the buffer. Inclusion of the server name allows for features like share scoping.

On successful response from the server, the client receives the TreeId in the header along with the ShareFlags and ShareCapabilities. Currently, the share flags indicate to the client what the CSC caching properties are for a share, but more may be added later on. The capabilities tell the client whether the file system backing the share supports either file-level security, timewarp, TxF (transactional file system), or client-side encryption. If a file system supports these properties on some subtrees but not all (such as the case of mount points), it should return that it does support them and simply fail the individual requests to use them in cases where it is not allowed. The client should ignore any flags or capabilities it does not understand.

Tree Disconnect

Tears down an existing TreeConnect.

| Format |
|---|
| typedef struct _SMB2_REQ_TREE_DISCONNECT {<br>    USHORT StructureSize;<br>    USHORT Reserved;<br>} SMB2_REQ_TREE_DISCONNECT;<br>typedef struct _SMB2_REQ_TREE_DISCONNECT {<br>    USHORT StructureSize; |

-continued

| Format |
|---|
|     USHORT Reserved;<br>} SMB2_REQ_TREE_DISCONNECT; |

Once the command is processed, no more operations can be successfully completed on the given TreeId. The TreeId is taken from the header.

Create

Opens a file, printer, or pipe.

| Format |
|---|
| #define SMB2_OPLOCK_LEVEL_NONE        0<br>#define SMB2_OPLOCK_LEVEL_II           1<br>#define SMB2_OPLOCK_LEVEL_EXCLUSIVE  8<br>#define SMB2_OPLOCK_LEVEL_BATCH       9<br>#define SMB2_OPLOCK_LEVEL_DIRCHANGE 16<br>typedef struct _SMB2_REQ_CREATE<br>{<br>    USHORT StructureSize;                           // = sizeof(SMB2_REQ_CREATE)<br>    UCHAR   SecurityFlags;                       // QOS security flags<br>    UCHAR   RequestedOplockLevel;          // Desired oplock level<br>    ULONG       ImpersonationLevel;           // QOS security info<br>    UINT64  SmbCreateFlags;<br>    UINT64  RootDirectoryFid;               // For relative opens<br>    ACCESS_MASK DesiredAccess;<br>    ULONG       FileAttributes;<br>    ULONG       ShareAccess;<br>    ULONG       CreateDisposition;<br>    ULONG       CreateOptions;<br>    USHORT     NameOffset;                    // Name relative to share<br>    USHORT     NameLength;<br>    ULONG       CreateContextsOffset;        // Extra create parameters<br>    ULONG       CreateContextsLength;<br>    UCHAR       Buffer[1];                     // Name[ ], CreateContexts[ ]<br>} SMB2_REQ_CREATE, *PSMB2_REQ_CREATE;<br>typedef struct _SMB2_CREATE_CONTEXT<br>{<br>    ULONG       Next;<br>    USHORT     NameOffset;<br>    USHORT     NameSize;<br>    USHORT     Reserved;<br>    USHORT     DataOffset;<br>    ULONG       DataSize;<br>    UCHAR       Buffer[1];   // Name[ ], Data[ ]<br>} SMB2_CREATE_CONTEXT, *PSMB2_CREATE_CONTEXT;<br>typedef struct _SMB2_RESP_CREATE<br>{<br>    USHORT StructureSize;                           // = sizeof(SMB2_RESP_CREATE)<br>    UCHAR   OplockLevel;                     // The oplock granted on the file<br>    UCHAR   Reserved;<br>    ULONG   CreateAction;                  // Action taken by create<br>    UINT64  FileId;                         // ID for this open<br>    UINT64  CreationTime;                 // File time information<br>    UINT64  LastAccessTime;<br>    UINT64  LastWriteTime;<br>    UINT64  LastChangeTime;<br>    UINT64  AllocationSize;              // File size information<br>    UINT64  EndOfFile;<br>    ULONG   FileAttributes;              // NT attributes of the file<br>    ULONG Reserved2;                       // For 8-byte alignment<br>    ULONG CreateContextsOffset;          // Responses for Extra Create<br>                                                       // Parameters<br>    ULONG CreateContextsLength;<br>    UCHAR Buffer[1];                         // CreateContexts[ ]<br>} SMB2_RESP_CREATE, *PSMB2_RESP_CREATE;<br>#define SMB2_CREATE_EA_BUFFER                         (ULONG)('AtxE')<br>#define SMB2_CREATE_SD_BUFFER                         (ULONG)('DceS')<br>#define SMB2_CREATE_MARSHALLED_TRANSACTION  (ULONG)('xTrM')<br>#define SMB2_CREATE_MINIVERSION                       (ULONG)('rVnM')<br>#define SMB2_CREATE_VERSION                             (ULONG)('sreV')<br>#define SMB2_CREATE_NTFS_FID                            (ULONG)('diFN')<br>#define SMB2_CREATE_TIMEWARP_TOKEN              (ULONG)('prWT')<br>#define SMB2_CREATE_EFS_STREAM                        (ULONG)('sfE$')<br>#define SMB2_CREATE_CLIENT_SIDE_ENCRYPTION  (ULONG)('1ESC') |

The create request is a variable length request to allow creation of files with various attributes other than the traditional well-defined attributes. The standard case (where no extended attributes are present) is straightforward; the client fills in the RootDirectoryFid (for a relative open if desired), the DesiredAccess, FileAttributes, ShareAccess, CreateDisposition, and CreateOptions. They set the desired oplock level, and fill in the SecurityFlags & Impersonation level for QoS. Currently there are no SmbCreateFlags defined but space has been allocated for their use. The client sends this packet to the server, which opens the file and either returns a failure code, or returns Success along with the FileId that identifies the file, the Creation/LastAccess/LastWrite/LastChangeTime, the AllocationSize and EndOfFile information, and the FileAttributes.

That is the normal case that operates in much the same way that the current protocol does. For more advanced cases, consider that the user wants to create a file with extended attributes (EAs). In the previous protocol, there was an entirely different way of handling this, through a Transact call. Now, the client can build up the create request as normal, but also add a CreateContext to the end of the create request. The request would have the name "ExtA" and the Data would contain the EAs to set on the file. When the server receives this, it would parse out the EA data and issue it with the create. Create contexts can also be returned on the create response to provide additional information. For the first iteration, the names will be of length 4 so we can format them as a long and switch on them. The current list of CreateContext's is as follows:

1) "ExtA"—Data contains the extended attributes to put on the created file.
2) "SecD"—Data contains a self-relative security descriptor to put on the created file.
3) "TWrp"—Data contains a timewarp timestamp that should be used to find the file to open. The timestamp is in the System Time format.
4) "MrTx"—Data contains a marshalled transaction to be used when opening files transactionally.
5) "MnVr"—Data contains a mini-version number (ULONG) to open a transacted file
6) "Vers"—Data contains the version number (ULONG) of the file opened (create response)
7) "NFid"—Data contains the NTFS Fid (LARGE_INTEGER) of the file opened (create response)
8) "$Efs"—Data contains the $EFS stream to be stamped on a new encrypted file
9) "CSE1"—Data contains the $EFS stream of the encrypted file opened (create response)

More CreateContext values can be added as servers support them. (As values are added they would either have a capability bit associated with them or be associated with a new dialect revision such that the client knows which tags the server supports before it issues the create request.) A server that receives a create request with an unrecognized context tag would fail the request.

Close

A client sends a Close to close an instance of a file that was opened previously. Once a close is processed, no file operations are allowed on the previous FID.

| Format |
| --- |
| typedef struct _SMB2_REQ_CLOSE { <br>     USHORT    StructureSize; <br>     USHORT    Reserved; <br>     ULONG    Flags; <br>     UINT64    FileId; <br>     UINT64    LastWriteTime; <br> } SMB2_REQ_CLOSE, *PSMB2_REQ_CLOSE; <br> typedef struct _SMB2_RESP_CLOSE { <br>     USHORT    StructureSize; <br>     USHORT    Reserved; <br> } SMB2_RESP_CLOSE, *PSMB2_RESP_CLOSE; |

For the Close command, the client specifies the FileId of the file being closed, along with the LastWriteTime (in SystemTime format). This allows the client to set the last time a cached write was performed on the file as the last written time on the file. The client can also send zero for the LastWriteTime to indicate that they do not wish to specify one. The structure also allots room for Close flags which are currently undefined, but may be used at a later point.

Flush

A flush command informs the server to flush out all cached data on a given file.

| Format |
| --- |
| typedef struct _SMB2_REQ_FLUSH { <br>     USHORT StructureSize; <br>     USHORT Reserved1; <br>     ULONG Reserved2; <br>     UINT64  FileId; <br> } SMB2_REQ_FLUSH, *PSMB2_REQ_FLUSH; <br> typedef struct _SMB2_RESP_FLUSH { <br>     USHORT StructureSize; <br>     USHORT Reserved; <br> } |

Upon successful response from the server, the client is guaranteed that all cached data has been flushed to its backing persistent store. The client specifies the FileId of the file it wishes to flush. A flush on a pipe will not return until all data is consumed from that pipe, which may take a while.

Read

Reads data from an open file.

| Format |
| --- |
| typedef struct _SMB2_REQ_READ <br> { <br>     USHORT StructureSize;    // = sizeof(SMB2_REQ_READ) <br>     UCHAR Padding;    // Requested padding of read data <br>         // response from beginning of header <br>     UCHAR Reserved; <br>     ULONG Length;    // The length of the read to send on <br>         // this channel <br>     UINT64 Offset;    // Offset of the read <br>     UINT64 FileId;    // Identifier of the file <br>         // being read |

| Format |
|---|
| ```
    ULONG    MinimumCount;              // The minimum bytes to read and
                                         // consider success
    ULONG    Channel;                   // The channel to send the remaining
                                         // data on
    ULONG    RemainingBytes;            // If channel != 0, additional bytes to
                                         // be read and sent on channel,
                                         // otherwise how much more planned to read
    USHORT   ReadChannelInfoOffset;     // If channel != 0, information about
    USHORT   ReadChannelInfoLength;     // channel to send additional data on.
    UCHAR    Buffer[1];                 // ReadChannelInfo
} SMB2_REQ_READ, *PSMB2_REQ_READ;
typedef struct _SMB2_RESP_READ
{
    USHORT   StructureSize;             // = sizeof(SMB2_RESP_READ)
    UCHAR    DataOffset;                // Offset to data in the packet
    UCHAR    Reserved;
    ULONG    DataLength;                // Length of data returns as part of
                                         // this packet
    ULONG    DataRemaining;             // Length of data that is being sent on
                                         // the alternate channel if specified,
                                         // otherwise how much more we are ready
                                         // to have read
    UCHAR    Buffer[1];                 //Pad[ ], Data[ ]
} SMB2_RESP_READ, *PSMB2_RESP_READ;
``` |

Read is pretty self explanatory. The client specifies the file (via FileId), the offset, and the length of the read, and the server returns the data. There are a couple other things the client can specify. The MinCount tells the server the minimum amount it will read from a file for a successful return. If the read comes up short, the server will simply return a failure instead of returning the entire data buffer. The client can also recommend Padding for better processing. This is the offset into the read response packet where the server should put the data. This allows the client to lay down the read response buffers in a more efficient way when it receives the information off the transports. The remaining field indicates to the server how much the entire read will be for if this is only a section of the read. Thus, if the client is going to read 8 k in 1 k chunks, it would issue a read for 1 k with Remaining=7 k. This allows the server the option to optimize by reading the entire 8 k in one operation and buffering the data back to the client.

On the server response, it indicates how much data it is returning (in the DataLength field) along with the DataRemaining that was specified in the read command.

If the channel specified in the command is not the channel that the command came in on, than the user is asking for a channel read. This means that if I request a read on channel 0 with "channel=1" and "Length=0, Remaining=64 k", the server will respond with "DataLength=0, DataRemaining=64 k" and the next 64 k bytes that come across Channel 1 will be the data. The client is responsible for synchronizing this to make sure no data responses are outstanding on channel 1 when this command is issued. A client could also issue (on channel 0) "read Channel=1, DataLength=1 k, Remaining=7 k", such that the response would contain the first 1 k of data and the rest of the data (the last 7 k) would be streamed across channel 1.

Write

Writes data to an open file.

| Format |
|---|
| ```
typedef struct _SMB2_REQ_WRITE
{
    USHORT   StructureSize;             // = sizeof(SMB2_REQ_WRITE)
    USHORT   DataOffset;                // Offset to data from header
    ULONG    Length;                    // Length of data being written
    UINT64   Offset;                    // File offset of the write
    UINT64   FileId;                    // Identifier for the file being
                                         // written to
    ULONG    Channel;                   // If non-zero, the channel where
                                         // the remaining data should be sent
    ULONG    Remaining;                  // Number of bytes to be sent on
channel
    USHORT   WriteChannelInfoOffset;    // If channel != 0, information
                                         // about the channel
    USHORT   WriteChannelInfoLength;    // we wish to write data to.
    ULONG    Flags;
    UCHAR    Buffer[1];                 // WriteChannelInfo
} SMB2_REQ_WRITE, *PSMB2_REQ_WRITE;
typedef struct _SMB2_RESP_WRITE
{
    USHORT   StructureSize;             // = sizeof(SMB2_RESP_WRITE)
    USHORT   Reserved;
``` |

| Format | |
|---|---|
| ULONG Count; | // How much of the data was written |
| ULONG Remaining; | // How many bytes we can receive on // the channel |
| USHORT WriteChannelInfoOffset; | // If channel != 0, optional // information about the channel we |
| USHORT WriteChannelInfoLength; | // wish to write data to. |
| UCHAR Buffer[1]; | // WriteChannelInfo |
| } SMB2_RESP_WRITE, *PSMB2_RESP_WRITE; | |

The client fills in the file (identified by the FileId), the offset, and the length for the write, and attached the data. It is recommended that the data be padded as returned in the original negotiate response to help server performance. The client can also indicate how much more data it will write to the server to allow the server to optimize. On the response, the server indicates how much was written, and returns the amount it is still expecting.

If the channel specified in the write is not the channel the command came in on, than the client is asking to stream the data on another channel. An example would be a write received on channel 0 with "Channel=1, Length=0, Remaining=64 k". The client is asking to stream a 64 k write on Channel 1. The server would respond with "Count=0, Remaining=64 k" to allow the write. The response will include and AsyncId for a second response that will come after the data is sent on the channel and ack'd. Then the next 64 k bytes streamed on Channel 1 would be the data. (No header). Upon completion, the server will send a SMB2_RESP_WRITE on channel 0 to indicate the success/failure of the operation and use the AsyncId information to send a second reply, unless the specific channel allows for inherent acknowledgement in which case it will occur on the channel itself.

Break_Oplock

Used to request and acknowledge the release of opportunistic locks taken on a file.

| Format | |
|---|---|
| typedef struct _SMB2_REQ_BREAK_OPLOCK { | |
| USHORT StructureSize; | // = sizeof (SMB2_REQ_BREAK_OPLOCK) |
| UCHAR OplockLevel; | // Level to break to. (Level2 or None) |
| UCHAR Reserved; | |
| ULONG Reserved2; | // Timeout in seconds |
| UINT64 FileId; | // Identifier of the file being locked/ unlocked |
| } SMB2_REQ_BREAK_OPLOCK, *PSMB2_REQ_BREAK_OPLOCK; | |
| typedef struct _SMB2_RESP_BREAK_OPLOCK { | |
| USHORT StructureSize; | // = sizeof(SMB2_RESP_LOCK) |
| UCHAR OplockLevel; | // Level broken to (<= level requested) |
| UCHAR Reserved; | |
| ULONG Reserved2; | |
| UINT64 FileId; | |
| } SMB2_RESP_BREAK_OPLOCK, *PSMB2_RESP_BREAK_OPLOCK; | |

When another user requests access to a file that a client holds an opportunistic lock on in a fashion that requires breaking the existing lock, SRV will send an SMB2_RESP_BREAK_OPLOCK to the client. The client is then expected to send a REQ_BREAK_OPLOCK for the given file to release their oplock, and SRV will respond again to acknowledge this.

Lock

Used to request byte-range locks, and also used to request opportunistic locks (and inform the client when one is broken).

| Format |
|---|
| #define SMB2_LOCKFLAG_SHARED_LOCK     0x01 |
| #define SMB2_LOCKFLAG_EXCLUSIVE_LOCK  0x02 |
| #define SMB2_LOCKFLAG_UNLOCK          0x04 |
| #define SMB2_LOCKFLAG_FAIL_IMMEDIATELY 0x10 |
| typedef struct _SMB2_LOCK |
| { |
|   UINT64 Offset; |
|   UINT64 Length; |
|   ULONG Flags; |
|   ULONG Reserved; |
| } SMB2_LOCK, *PSMB2_LOCK; |
| typedef struct _SMB2_REQ_LOCK |
| { |

| | |
|---|---|
| USHORT StructureSize; | // = sizeof (SMB2_REQ_LOCK) |
| UCHAR LockCount; | |
| ULONG Reserved; | |
| UINT64 FileId; | // Identifier of the file // being locked/ unlocked |
| SMB2_LOCK Locks[1]; | // Array of size (LockCount) |
| } SMB2_REQ_LOCK, *PSMB2_REQ_LOCK; | |
| typedef struct _SMB2_RESP_LOCK { | |
| USHORT StructureSize; | // = sizeof (SMB2_RESP_LOCK) |
| USHORT Reserved; | |
| } SMB2_RESP_LOCK, *PSMB2_RESP_LOCK; | |

Syntax for the LOCK request is similar to the SMB1 Lock request. The client specifies the FileId, and one or more SMB_LOCK structures indicating the offset and length they wish to lock. All of these LOCK structures must be either locks or unlocks. However, you can mix shared and exclusive lock requests in a single batched lock operation. The most common use for lock batching would be claiming a series of locks as part of a batch oplock break, and is most useful when you are assured that all the locks will succeed.

A successful return indicates to the client that they attained (or released) the requested byte range locks. On the failure case, the byte range locks were not granted.

Echo

Echo is used by a client to determine whether a server is still up at a given point in time. Upon receipt of this command, the server will simply turn it around and return success.

| Format |
|---|
| typedef struct _SMB2_REQ_ECHO {<br>   USHORT StructureSize;<br>   USHORT Reserved;<br>} SMB2_REQ_ECHO, *PSMB2_REQ_ECHO;<br>typedef struct _SMB2_RESP_ECHO {<br>   USHORT StructureSize;<br>   USHORT Reserved;<br>} SMB2_RESP_ECHO, *PSMB2_RESP_ECHO; |

The server responds to the packet to indicate it is working properly. Used to allow the client to "ping" the server.

Cancel

Used by the client to request the cancellation of a sent operation.

| Format |
|---|
| typedef struct _SMB2_REQ_CANCEL {<br>   USHORT StructureSize;<br>   USHORT Reserved;<br>} SMB2_REQ_CANCEL, *PSMB2_REQ_CANCEL; |

A cancel has no response, but should result in the command itself either being completed successfully, or failing with STATUS_CANCELLED, and it should happen as soon as possible. The operation being sent is identified because it will share the MessageId of the cancel command. This is the one case where a MessageId sent to the server may already have been used previously. If a response came with an AsyncId, that should be present in the header, and will be used to locate the command on the server.

Ioctl

Ioctl is used to issue a Device Control or a File System Control command across the network.

| Format |
|---|
| ```
// Request
typedef struct _SMB2_REQ_IOCTL
{
    USHORT StructureSize;       // = sizeof(SMB2_REQ_TRANSACT)
    USHORT Reserved;
    ULONG  CtlCode;
    UINT64 FileId;
    ULONG  InputOffset;         // Bytes for input buffer
    ULONG  InputCount;          // Count of parameter bytes in this
                                // message
    ULONG  MaxInputResponse;    // Max bytes server can return for
                                // response parameters
    ULONG  OutputOffset;        // Data bytes location
    ULONG  OutputCount;         // Count of data bytes in this
                                // message
    ULONG  MaxOutputResponse;   // Max bytes server can return for
                                // response data
    ULONG  Flags;
    ULONG  Reserved2;
    UCHAR  Buffer[1];           // Parameters[ ], Data[ ]
} SMB2_REQ_IOCTL, *PSMB2_REQ_IOCTL;
                                // Response
typedef struct _SMB2_RESP_IOCTL
{
    USHORT StructureSize;       // = sizeof(SMB2_RESP_TRANSACT)
    USHORT Reserved;
    ULONG  CtlCode;
    UINT64 FileId;
    ULONG  InputOffset;         // Bytes for input buffer
    ULONG  InputCount;          // Count of parameter bytes in this
                                // message
    ULONG  OutputOffset;        // Data bytes location
    ULONG  OutputCount;         // Count of data bytes in this
                                // message
    ULONG  Flags;
    ULONG  Reserved2;
    UCHAR  Buffer[1];           // Parameters[ ], Data[ ]
} SMB2_RESP_IOCTL, *PSMB2_RESP_IOCTL;} SMB2_RESP_TRANSACT,
*PSMB2_RESP_TRANSACT;
``` |

An IOCTL is used for issuing a generic file system or device control command across the network. It packs the input and output buffers based on the METHOD of the control code and sends them across the network. The server side than repackages them and issues the FSCTL/IOCTL against the file object. The results are likewise packed up and returned to the user with the status code. The set of allowable FSCTL/IOCTL codes can be limited by both SRV or the underlying file systems. (Not all are necessarily valid remotely.)

For buffered or direct requests, only Input is valid on request and Output is sent on response. For neither requests, both Input and Output are sent both ways.

Query Directory

Allows the client to query directory enumerations on an open directory handle across the network.

---
Format
---

```
//
// QUERY_DIRECTORY Command
//
#define SMB2_REOPEN      0x10
// Request
typedef struct _SMB2_REQ_QUERY_DIRECTORY
{
    USHORT  StructureSize;       // =
                                 // sizeof
    (SMB2_REQ_QUERY_DIRECTORY)
    UCHAR   FileInformationClass;
    UCHAR   Flags;               // SL_/SMB2_flags
    ULONG   FileIndex;
    UINT64  FileId;
    USHORT  FileNameOffset;
    USHORT  FileNameLength;
    ULONG   OutputBufferLength;
    UCHAR   Buffer[1];           // FileName parameter
} SMB2_REQ_QUERY_DIRECTORY,
*PSMB2_REQ_QUERY_DIRECTORY;
// Response
typedef struct _SMB2_RESP_QUERY_DIRECTORY
{
    USHORT  StructureSize;       // =
sizeof(SMB2_RESP_QUERY_DIRECTORY)
    USHORT  OutputBufferOffset;
    ULONG   OutputBufferLength;
    UCHAR   Buffer[1];           // Response data
} SMB2_RESP_QUERY_DIRECTORY,
*PSMB2_RESP_QUERY_DIRECTORY;
```

---

The QueryDirectory call matches existing NT semantics very closely. The caller provides the InfoClass, the FileId for the directory open, the filename portion (that specifies either the wildcard/file search params or the resume name for an existing search) and any valid SL_flags associated with the call, and SRV will return a buffer up to OutputBufferLength.

There is also a new flag (SMB2_REOPEN) that can be included in the QueryDirectory flags structure. This flag is a stronger version of the SL_RESTART_SCAN flag. The latter only allows restarting scans where the search specified hasn't changed. (i.e. restart a *.* or a t* search.) The latter tells the server to restart a scan where the search specified has changed. To use this flag, the caller must guarantee exclusive use across the call, and no outstanding operations (such as change notifies). The server takes the appropriate steps to perform this operation, which may involve closing and reopening the underlying directory handle on the server side. This is transparent to the client.

Change Notify

This potentially long-running operation allows a client to register for change notifications on a directory.

---
Format
---

```
//
// CHANGE_NOTIFY Command
//
// Request
typedef struct _SMB2_REQ_CHANGE_NOTIFY
{
    USHORT  StructureSize;       // =
                                 // sizeof
                                 (SMB2_REQ_CHANGE_NOTIFY)
    USHORT  Flags;               // SL_WATCH_TREE?
    ULONG   OutputBufferLength;
    UINT64  FileId;
    ULONG   CompletionFilter;
    ULONG   Reserved;
} SMB2_REQ_CHANGE_NOTIFY,
*PSMB2_REQ_CHANGE_NOTIFY;
// Response
typedef struct _SMB2_RESP_CHANGE_NOTIFY
{
    USHORT  StructureSize;       // =
                                 // sizeof
                                 (SMB2_RESP_CHANGE_NOTIFY)
    USHORT  OutputBufferOffset;
    ULONG   OutputBufferLength;
    UCHAR   Buffer[1];           // Notify data
} SMB2_RESP_CHANGE_NOTIFY,
*PSMB2_RESP_CHANGE_NOTIFY;
```

---

The caller sends the FileId for the directory along with a CompletionFilter specifying which changes the caller is interested in. They also can send the SL_WATCH_TREE flag to indicate a recursive notify operation. This operation will almost always invoke the "async" behavior since it can pend for an infinite amount of time. Also note that any further change notify requests on the same handle will pend waiting for the first to complete, just as in local file system behavior.

Query Info

Allows the client to query information from the remote system. Currently this can be used to query file information, file-system information, security information, or quota information.

---
Format
---

```
//
// QUERY_INFO
//
#define SMB2_0_INFO_FILE           0x01
#define SMB2_0_INFO_FILESYSTEM     0x02
#define SMB2_0_INFO_SECURITY       0x03
#define SMB2_0_INFO_QUOTA          0x04
typedef struct _SMB2_QUERY_QUOTA_INFO {
    UCHAR ReturnSingleEntry;     // Indicates that only a single
                                 // entry should be returned rather
```

| Format |
|---|
| ```
                                        // than filling the buffer with
                                        // as many entries as
                                        // possible.
    UCHAR   RestartScan;                // Indicates whether the scan of the
                                        // quota information is to be
                                        // restarted from the beginning.
    USHORT  Reserved;
    ULONG   SidListLength;              // Supplies the length of the SID
                                        // list if present
    ULONG   StartSidLength;             // Supplies optional SID that
                                        // indicates the returned information
                                        // is to start with an entry other
                                        // than the first. This parameter is
                                        // ignored if a SidList is given
    ULONG   StartSidOffset;             // Supplies the offset of Start Sid
                                        // in the buffer
} SMB2_QUERY_QUOTA_INFO, *PSMB2_QUERY_QUOTA_INFO;
// Request
typedef struct _SMB2_REQ_QUERY_INFO
{
    USHORT  StructureSize;              // = sizeof
                                        (SMB2_REQ_QUERY_INFO)
    UCHAR   InfoType;                   // Determines info type
                                        //(SMB2_0_INFO_*)
    UCHAR   FileInfoClass;
    ULONG   OutputBufferLength;
    USHORT  InputBufferOffset;          // Input buffer only valid on
                                        // Quota calls
    USHORT  Reserved;
    ULONG   InputBufferLength;
    Union {
        ULONG   SecurityInformation;    // For Query Security calls
        ULONG   EaIndex;                // For QueryEA calls
    };
    ULONG   Flags;
    UINT64  FileId;
    UCHAR   Buffer[1];
} SMB2_REQ_QUERY_INFO, *PSMB2_REQ_QUERY_INFO;
// Response
typedef struct _SMB2_RESP_QUERY_INFO
{
    USHORT  StructureSize;              // = sizeof
                                        (SMB2_RESP_QUERY_INFO)
    USHORT  OutputBufferOffset;
    ULONG   OutputBufferLength;
    UChAR   Buffer[1];                  // File Info
} SMB2_RESP_QUERY_INFO, *PSMB2_RESP_QUERY_INFO;
``` |

The client specifies in the InfoType the SMB2_0_INFO_* options to indicate whether this is a request for file information, file system information, security information, or quota information. The FileId denotes the file in question (for file info or security information.) The volume the file resides on is used for file system info or quota requests.

The sub-information level is filled into FileInfoClass, and is dependent on the type of information being queried. For file information queries it will be a FILE_INFORMATION_CLASS, where as for file system information it will be a FS_INFORMATION_CLASS. For quota and security, it will be 0.

The input buffer is currently only used for Quota requests, as they take the SMB2_QUERY_QUOTA_INFO structure on input to determine what is being asked for. For the other requests it will be empty.

OutputBufferLength specifies the maximum amount of data to return to the user.

Set Info

Allows the client to set information on the remote system. Currently this can be used to set file information, file-system information, security information, or quota information.

| Format |
|---|
| ```
//
// SET_INFO
//
// Request
typedef struct _SMB2_REQ_SET_INFO
{
    USHORT  StructureSize;              // = sizeof
                                        (SMB2_REQ_SET_INFO)
    UCHAR   InfoType;
    UCHAR   FileInfoClass;
    ULONG   BufferLength;
    USHORT  BufferOffset;
    USHORT  Reserved;
    Union {
        ULONG   Reserved2;
        ULONG   SecurityInformation;    // For SET_SECURITY calls
    };
    UINT64  FileId;
    UCHAR   Buffer[1];                  // File info
} SMB2_REQ_SET_INFO, *PSMB2_REQ_SET_INFO;
// Response
typedef struct SMB2_RESP_SET_INFO
{
``` |

-continued

| Format |  |
|---|---|
| USHORT StructureSize; | // = sizeof (SMB2_RESP_SET_INFO) |
| } SMB2_RESP_SET_INFO, *PSMB2_RESP_SET_INFO; | |

The type of information being set and the specific class are set in the Flags and FileInfoClass fields as described for QUERY_INFO. The input buffer provided is the information being set, and the FileId identifies the file.

For SetSecurity calls, the SecurityInformation field denotes the info being set. (i.e. OWNER_SECURITY_INFORMATION, etc.)

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method for initiating a session allowing multiple connections in a file system and receiving transport information, the method comprising:
   receiving a request to initiate a session between a client and a server;
   determining available transports for establishing a connection between the client and the server;
   selecting an initial transport for sending commands between the client and server;
   establishing a first connection via the initial transport;
   binding the first connection to the session;
   establishing a second connection via a second transport of the available transports;
   binding the second connection to the session;
   sending a command received from the application through the first connection bound to the session, the command requesting data; and
   receiving, in response to the command, the requested data via the second connection.

2. The method of claim 1, wherein receiving the request comprises receiving a request from an application to access a file stored remotely on the server using Server Message Block (SMB) protocol.

3. The method of claim 1, wherein receiving the request comprises setting up a session and sending one or more packets to the server to negotiate available dialects of the network protocol used to communicate between the client and server.

4. The method of claim 1, wherein determining available transports comprises identifying one or more addresses of the server.

5. The method of claim 1, wherein determining available transports comprises querying a client operating system to identify available network interfaces.

6. The method of claim 1, wherein determining available transports comprises querying sending a capabilities request to the server to identify available network interfaces on the server.

7. The method of claim 1, wherein selecting the initial transport comprises selecting based on application-specified criteria that establishes the application's connection preferences.

8. The method of claim 1, wherein establishing the connection comprises sending a negotiate message over the selected transport that sets up a Server Message Block (SMB) connection.

9. The method of claim 1, wherein binding the first connection comprises preparing the first connection for use by the session for sending commands from the client to the server.

10. The method of claim 1, wherein binding the first connection comprises storing information for ending the session.

11. The method of claim 1, wherein sending the command comprises selecting among multiple inbound connections to choose one or more connections suited to handling the current command.

12. The method of claim 1, wherein the command includes an indication to the server to return the requested data via the second connection.

13. A nontransitory computer-readable storage device comprising instructions which, when executed by a processor, cause the processor to perform a method, the method comprising:
   receiving a request to initiate a session between a client and a server;
   determining available transports for establishing a connection between the client and the server;
   selecting an initial transport for sending commands between the client and server;
   establishing a first connection via the initial transport;
   binding the first connection to the session;
   establishing a second connection via a second transport of the available transports;
   binding the second connection to the session;
   sending a command received from the application through the first connection bound to the session, the command requesting data; and
   receiving, in response to the command, the requested data via the second connection.

14. A system comprising:
   at least one processor;
   memory, operatively connected to the at least one processor, and containing instruction that, when executed by the at least one processor, cause the at least one processor to perform a method, the method comprising:
   receiving a request to initiate a session between a client and a server;
   determining one or more available transports available for establishing a connection between the client and the server;
   selecting an initial transport for sending commands between the client and server;
   establishing a connection via the selected transport;
   binding the established connection to the initiated session; and
   sending a command received from the application through the established connection bound to the session.

15. The system of claim 14, wherein receiving the request comprises receiving a request from an application to access a file stored remotely on the server using Server Message Block (SMB) protocol.

16. The system of claim 14, wherein receiving the request comprises setting up a session and sending one or more packets to the server to negotiate available dialects of the network protocol used to communicate between the client and server.

17. The system of claim 14, wherein the command includes an indication to the server to return the requested data via the second connection.

18. The system of claim 14, wherein determining available transports comprises identifying one or more addresses of the server.

19. The system of claim 14, wherein determining available transports comprises querying a client operating system to identify available network interfaces.

20. The system of claim 14, wherein determining available transports comprises querying sending a capabilities request to the server to identify available network interfaces on the server.

* * * * *